(12) United States Patent
Shimodaira

(10) Patent No.: US 8,086,024 B2
(45) Date of Patent: Dec. 27, 2011

(54) DEFECT DETECTION APPARATUS, DEFECT DETECTION METHOD AND COMPUTER PROGRAM

(75) Inventor: Masato Shimodaira, Osaka (JP)

(73) Assignee: Keyence Corporation, Osaka (JP)

( * ) Notice: Subject to any disclaimer, the term of this patent is extended or adjusted under 35 U.S.C. 154(b) by 473 days.

(21) Appl. No.: 12/352,810

(22) Filed: Jan. 13, 2009

(65) Prior Publication Data

US 2009/0208050 A1 Aug. 20, 2009

(30) Foreign Application Priority Data

Feb. 19, 2008 (JP) ................................ 2008-037098

(51) Int. Cl.
  *G06K 9/00* (2006.01)
(52) U.S. Cl. ...................................................... 382/149
(58) Field of Classification Search .................. 382/149; 356/237.2
  See application file for complete search history.

(56) References Cited

U.S. PATENT DOCUMENTS

| | | | | |
|---|---|---|---|---|
| 5,424,853 A | * | 6/1995 | Miyaza | 358/451 |
| 5,589,949 A | * | 12/1996 | Miyaza et al. | 358/451 |
| 5,663,809 A | * | 9/1997 | Miyaza et al. | 358/450 |

FOREIGN PATENT DOCUMENTS

| | | |
|---|---|---|
| JP | 2004-061500 | 2/2004 |
| JP | 2004-317190 | 11/2004 |
| JP | 2006-050356 | 2/2006 |

* cited by examiner

*Primary Examiner* — Roy M Punnoose
(74) *Attorney, Agent, or Firm* — Kilyk & Bowersox, P.L.L.C.

(57) ABSTRACT

There is provided a defect detection apparatus capable of highly accurately detecting a defect of a size not larger than a size desired by the user, in which the size setting device sets the defect size, the reduction ratio setting device sets an image reduction ratio based on the set defect size, the image reduction device generates a reduced image obtained by reducing the original multi-valued image, the filter processing device performs filter processing on the reduced image for removing a defect in the reduced image, the image enlarging device generates an enlarged image obtained by enlarging the reduced image, subjected to the filter processing, at an image enlargement ratio corresponding to the reciprocal of the image reduction ratio, and the difference calculating device generates a difference image obtained by performing a calculation of a difference between the original multi-valued image and the enlarged image.

32 Claims, 17 Drawing Sheets

MAIN SCANNING DIRECTION

B — — B'

F I G. 9A
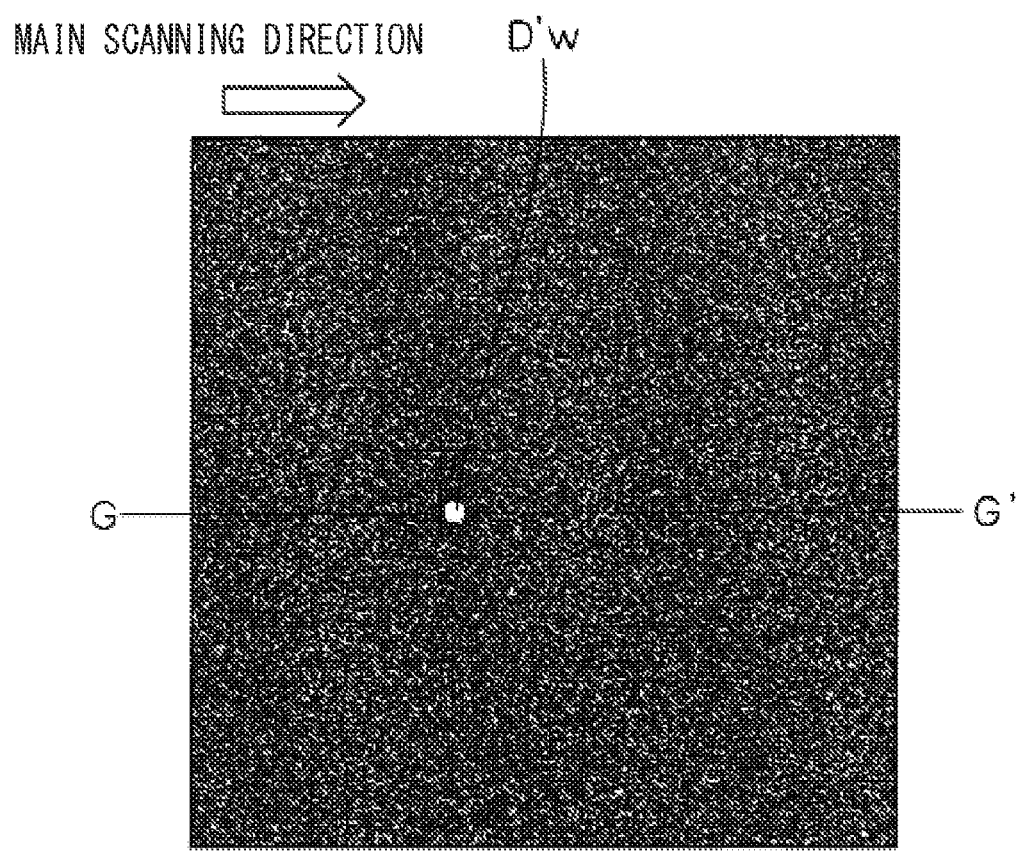
F I G. 9B
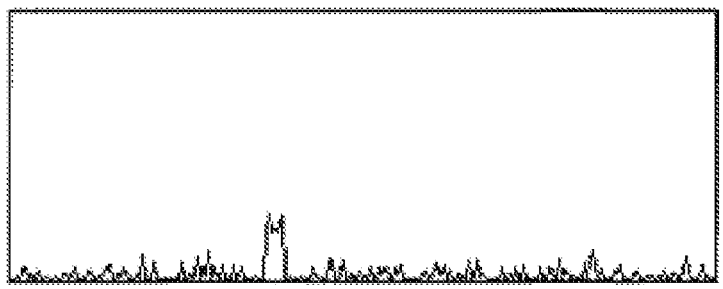

DEFECT DETECTION APPARATUS, DEFECT DETECTION METHOD AND COMPUTER PROGRAM

CROSS-REFERENCE TO RELATED APPLICATIONS

The present application claims foreign priority based on Japanese Patent Application No. 2008-037098, filed Feb. 19, 2008, the contents of which is incorporated herein by reference.

BACKGROUND OF THE INVENTION

1. Field of the Invention

The present invention relates to a defect detection apparatus for detecting a defect such as a dust, a flaw, a dirt on an object surface from a multi-valued image including shading, acquired by picking up an image of the object surface, a defect detection method employed in the defect detection apparatus, and a computer program for making a computer execute processing in the defect detection method.

2. Description of the Related Art

As a conventional example, an inspection apparatus has been proposed in which n-order approximation is performed by adopting the least square method on each line in an original image which was acquired by image-pickup by a digital camera and includes shading and a singular point formed of a defect such as a dirt, a flaw or a dirt, data acquired on all lines are integrated to generate shading image data as flattened data, a difference between the original data and the shading image data is calculated, and when the difference shows a singular point larger than a prescribed value, the singular point is determined to be a singular point due to the defect (refer to e.g. Japanese Patent Application Laid-Open No. 2006-050356).

SUMMARY OF THE INVENTION

However, in the conventional example, in a case where a non-periodic complex shading is generated, setting an appropriate order n of an n-order approximate curve for detecting a defect is difficult for the user, and even when a shading image is generated with the order n set large, the shading image is not consistent with the original image. Hence there is a problem in that an approximate error occurs in the inconsistent portion and a difference due to the approximate error cannot be distinguished from a difference due to a defect portion. For solving this problem, it is required to set the order n larger, but in the case of setting the order n larger, there is a problem in that the processing time for the n-order appropriation becomes longer and an n-order approximate curve so far as tracking the defect portion is generated, which prevents detection of the defect, thereby leading to an unstable detection operation.

Further, in a case where the periodical shading occurs, the shading image can be made consistent with the original image by use of an n-order approximate curve having a low order. However, there is a problem in that, when the shading generation state changes in the longitudinal and lateral directions of the original image, malfunction suddenly occurs in a normal operation performed with the n-order approximate curve having a low order. For eliminating this malfunction, it is required to set an optimal order n of the n-order approximate curve in accordance with the shading generation states in the longitudinal and lateral directions. However, there is a problem in that, for example in a case of inspection of a defect on a film, the shading generation state is apt to vary and the detection operation thus becomes unstable.

The present invention has been made in view of the above problems, and has an object to provide a defect detection apparatus capable of highly accurately detecting a defect of a size not larger than a size desired by the user without depending upon a change and a variation in generation state of shading, a defect detection method employed in the defect detection apparatus, and a computer program for making a computer execute processing in the defect detection method.

In order to achieve the above object, a defect detection apparatus according to a first aspect of the invention is a defect detection apparatus for detecting a defect on an image-picked-up object surface from a multi-valued image picked up by an image pickup device, and has a configuration including: a size setting accepting device for accepting setting of a size of a defect as a detection object; a size setting device for setting the defect size accepted by the size setting accepting device; a reduction ratio setting device for setting an image reduction ratio in accordance with the defect size set by the size setting device; an image reducing device for generating a reduced image obtained by reducing the multi-valued image at the image reduction ratio; a filter processing device for performing filter processing on the reduced image for removing a defect in the reduced image; an image enlarging device for generating an enlarged image obtained by enlarging the reduced image, subjected to the filter processing by the filter processing device, at an image enlargement ratio corresponding to the reciprocal of the image reduction ratio; and a difference calculating device for generating a difference image obtained by performing a calculation of a difference between the multi-valued image and the enlarged image.

With such a configuration, without depending upon a change and a variation in generation state of shading included in a multi-valued image acquired by image-pickup by an image pickup device, a shading image included in an enlarge image is made substantially consistent with a shading image included in the original multi-valued image by an image reducing device and an image enlarging device, and a defect image of a size not larger than a size set by the user is removed from a reduced image by a filter processing device for removing a defect, so that a defect of a size not larger than the size desired by the user can be highly accurately detected from an image of a difference between the original multi-valued image and the enlarged image.

A defect detection apparatus according to a second aspect of the invention is a defect detection apparatus for detecting a defect on an image-picked-up object surface from a multi-valued image picked up by an image pickup device, and has a configuration including: an original image display device for displaying the multi-valued image; a defect image selection accepting device for accepting a selection of an image corresponding to a defect as a detection object or a defect as a non-detection object from the multi-valued image displayed on the original image display device; a size setting device for setting a defect size corresponding to the image accepted by the defect image selection accepting device; a reduction ratio setting device for setting an image reduction ratio in accordance with the defect size set by the size setting device; an image reducing device for generating a reduced image obtained by reducing the multi-valued image at the image reduction ratio; a filter processing device for performing filter processing on the reduced image for removing a defect in the reduced image; an image enlarging device for generating an enlarged image obtained by enlarging the reduced image, subjected to the filter processing by the filter processing device, at an image enlargement ratio corresponding to the reciprocal of the image reduction ratio; and a difference calculating device for generating a difference image obtained by performing a calculation of a difference between the multi-valued image and the enlarged image.

With such a configuration, a defect size is set by a size setting device only by the user selecting a defect image as a detection object or as a non-detection object from a multi-valued image displayed by an original image display device, and without depending upon a change and a variation in generation state of shading included in a multi-valued image acquired by image-pickup by an image pickup device, a shading image included in an enlarge image is made substantially consistent with a shading image included in the original multi-valued image by an image reducing device and an image enlarging device, and a defect image of a size not larger than a size set by the user is removed from a reduced image by a filter processing device for removing a defect, so that a defect of a size not larger than the size desired by the user can be highly accurately detected from an image of a difference between the original multi-valued image and the enlarged image.

It is preferred that a defect detection apparatus according to a third aspect of the invention include in the first aspect: a noise reduction degree setting accepting device for accepting setting of a noise reduction degree on the difference image generated by the difference calculating device; and a noise reduction processing device for subtracting or adding the accepted noise reduction degree from or to the difference image, to generate a noise-reduction-processed image.

With such a configuration, it is possible to reduce noise from the difference image at a desired reduction degree set by the user, so as to improve the accuracy in defect detection and also improve the visibility of the difference image.

It is preferred that a defect detection apparatus according to a fourth aspect of the invention include in the third aspect, a correction device for multiplying the noise reduction degree, the setting of which was accepted by the noise reduction degree setting device, by a reduction degree correction value proportional to a luminance value of the enlarged image in pixel units.

With such a configuration, it is possible to correct a reduction degree based upon a desired reduction degree set by the user, so as to further improve the accuracy in defect detection and also improve the visibility of the difference image.

It is preferred that a defect detection apparatus according to a fifth aspect of the invention include in the first aspect: a gain setting accepting device for accepting setting of a gain into the difference image; and a highlighting processing device for multiplying the difference image by the accepted gain to generate a highlighting-processed image.

With such a configuration, it is possible to perform highlighting processing on the difference image with a desired gain set by the user, so as to further improve the accuracy in defect detection and also improve the visibility of the difference image.

It is preferred that a defect detection apparatus according to a sixth aspect of the invention include in the fifth aspect, a correction device for multiplying the gain, the setting of which was accepted by the gain setting accepting device, by a gain correction value inversely proportional to a luminance value of the enlarged image in pixel units.

With such a configuration, it is possible to perform gain correction based upon a desired gain set by the user, so as to further improve the accuracy in defect detection and also improve the visibility of the difference image.

It is preferred that a defect detection apparatus according to a seven aspect of the invention include in the third aspect: a gain setting accepting device for accepting setting of a gain into the noise-reduction-processed image; and a highlighting processing device for multiplying the noise-reduction-processed image by the accepted gain to generate a highlighting-processed image.

With such a configuration it is possible to reduce noise from the difference image at a desired reduction degree set by the user, and also strengthen the noise-reduction-processed image with a desired gain set by the user, so as to further improve the accuracy in defect detection and also further improve the visibility of the difference image.

It is preferred that a defect detection apparatus according to an eighth aspect of the invention include in the seventh aspect, a correction device for multiplying the noise reduction degree, the setting of which was accepted by the noise reduction degree setting accepting device, by a reduction degree correction value proportional to a luminance value of the enlarged image in pixel units, and multiplying the gain, the setting of which was accepted by the gain setting accepting device, by a gain correction value inversely proportional to the luminance value of the enlarged image in pixel units.

With such a configuration, it is possible to keep a luminance value of a signal and a luminance value of noise with regard to a defect image of the difference image constant even when lighting is varying during image-pickup by dynamically correcting the noise reduction degree and the gain based upon a luminance value of the enlarged image, so as to further improve the accuracy in defect detection.

It is preferred that a defect detection apparatus according to a ninth aspect of the invention be configured in the first aspect such that the difference calculating device is configured to generate a positive difference image and a negative difference image, and include in the same aspect: a difference image selection accepting device for accepting a selection of at least one difference image between the positive difference image and the negative difference image; and a difference image selecting device for selecting the accepted difference image.

With such a configuration, it is possible for the user to freely select at least one difference image between a positive difference image showing a bright defect image having a higher luminance value than the luminance value of the generated enlarged image (shading image) and a negative difference image showing a dark defect image having a lower luminance value than the same.

It is preferred that a defect detection apparatus according to a tenth aspect of the invention include in the ninth aspect, a difference image displaying device for displaying the difference image selected by the difference image selecting device.

With such a configuration, it is possible for the user to easily check from the displayed difference image whether or not a defect of a size not larger than the set size has been detected.

It is preferred that a defect detection apparatus according to an eleventh aspect of the invention be configured in the first aspect such that the filter processing device is configured to set a filter size or the number of times of passage through the filter larger with a larger image reduction ratio set by the reduction ratio setting device.

With such a configuration, it is possible to optimally set a filter size or the number of times of passage through the filter by calculation in accordance with the image reduction ratio.

It is preferred that a defect detection apparatus according to a twelfth aspect of the invention be configured in the first aspect such that the filter processing device is configured to set a filter size or the number of times of passage through the filter smaller with a smaller image reduction ratio set by the reduction ratio setting device.

With such a configuration, it is possible to optimally set a filter size or the number of times of passage through the filter by calculation in accordance with the image reduction ratio.

It is preferred that a defect detection apparatus according to a thirteen aspect of the invention be configured in the first aspect such that the filter processing device is configured to set a filter size or the number of times of passage through the filter larger with a larger defect size set by the size setting device.

With such a configuration, it is possible to optimally set a filter size or the number of times of passage through the filter by calculation in accordance with the defect size.

It is preferred that a defect detection apparatus according to a fourteenth aspect of the invention be configured in the first aspect such that the filter processing device is configured to set a filter size or the number of times of passage through the filter smaller with a smaller defect size set by the size setting device.

With such a configuration, it is possible to optimally set a filter size or the number of times of passage through the filter by calculation in accordance with the defect size.

It is preferred that a defect detection apparatus according to a fifteenth aspect of the invention be configured in the first aspect such that the filter processing device is configured to decide the filter size in accordance with the defect size set by the size setting device.

With such a configuration, it is possible to optimally set a filter size in accordance with the defect size.

A defect detection method according to a sixteenth aspect of the invention is a defect detection method employed in a defect detection apparatus for detecting a defect on an image-picked-up object surface from a multi-valued image picked up by an image pickup device, the method having a configuration such that setting of a size of a defect as a detection object is accepted, the accepted defect size is set, an image reduction ratio is set in accordance with the set defect size, a reduced image obtained by reducing the multi-valued image at the image reduction ratio is generated, filter processing for removing a defect in the reduced image is performed on the reduced image, an enlarged image obtained by enlarging the reduced image, subjected to the filter processing, at an image enlargement ratio corresponding to the reciprocal of the image reduction ratio is generated, and a difference image obtained by performing a calculation of a difference between the multi-valued image and the enlarged image is generated.

With such a configuration, without depending upon a change and a variation in generation state of shading included in a multi-valued image acquired by image-pickup, a shading image included in an enlarge image is made substantially consistent with a shading image included in the original multi-valued image by image reducing processing and image enlarging processing, and a defect image of a size not larger than a size set by the user is removed from a reduced image by filter processing or removing a defect, so that a defect of a size not larger than the size desired by the user can be highly accurately detected from an image of a difference between the original multi-valued image and the enlarged image.

A defect detection method according to a seventeenth aspect of the invention is a defect detection method employed in a defect detection apparatus for detecting a defect on an image-picked-up object surface from a multi-valued image picked up by an image pickup device, the method having a configuration such that the multi-valued image is displayed, selection of an image corresponding to a defect as a detection object or a defect as a non-detection object is accepted from the displayed multi-valued image, a defect size corresponding to the accepted image is set, an image reduction ratio is set in accordance with the set defect size, a reduced image obtained by reducing the multi-valued image at the image reduction ratio is generated, filter processing for removing a defect in the reduced image is performed on the reduced image, an enlarged image obtained by enlarging the reduced image, subjected to the filter processing, at an image enlargement ratio corresponding to the reciprocal of the image reduction ratio is generated, and a difference image obtained by performing a calculation of a difference between the multi-valued image and the enlarged image is generated.

With such a configuration, a defect size is set only by the user selecting a defect image as a detection object or as a non-detection object from a displayed multi-valued image, and without depending upon a change and a variation in generation state of shading included in a multi-valued image acquired by image-pickup, a shading image included in the generated enlarged image is made substantially consistent with a shading image included in the original multi-valued image by image reducing processing and image enlarging processing, and a defect image of a size not larger than a size set by the user is removed from a reduced image by filter processing for removing a defect, so that a defect of a size not larger than the size desired by the user can be highly accurately detected from an image of a difference between the original multi-valued image and the enlarged image.

It is preferred that a defect detection method according to an eighteenth aspect of the invention be configured in the sixteenth aspect such that setting of a noise reduction degree into the generated difference image is accepted, and the accepted noise reduction degree is subtracted or added from or to the difference image, to generate a noise-reduction-processed image.

With such a configuration, it is possible to reduce noise from the difference image at a desired reduction ratio set by the user, so as to improve the accuracy in defect detection and also improve the visibility of the difference image.

It is preferred that a defect detection method according to a nineteenth aspect of the invention be configured in the eighteenth aspect such that the noise reduction degree with its setting accepted is multiplied by a reduction degree correction value proportional to a luminance value of the enlarged image in pixel units.

With such a configuration, it is possible to correct a reduction degree based upon a desired reduction degree set by the user, so as to further improve the accuracy in defect detection and also improve the visibility of the difference image.

It is preferred that a defect detection method according to a twentieth aspect of the invention be configured in the sixteenth aspect such that setting of a gain into the difference image is accepted, and the difference image is multiplied by the accepted gain to generate a highlighting-processed image.

With such a configuration, it is possible to perform highlighting processing on the difference image with a desired gain set by the user, so as to further improve the accuracy in defect detection and also improve the visibility of the difference image.

It is preferred that a defect detection method according to a twenty-first aspect of the invention be configured in the twentieth aspect such that the gain, the setting of which was accepted, is multiplied by a gain correction value inversely proportional to a luminance value of the enlarged image in pixel units.

With such a configuration, it is possible to perform gain correction based upon a desired gain set by the user, so as to further improve the accuracy in defect detection and also improve the visibility of the difference image.

It is preferred that a defect detection method according to a twenty-second aspect of the invention be configured in the eighteenth aspect such that setting of a gain into the noise-reduction-processed image is accepted, and the noise-reduction-processed image is multiplied by the accepted gain to generate a highlighting-processed image.

With such a configuration it is possible to reduce noise from the difference image at a desired reduction ratio set by the user, and also strengthen the noise-reduction-processed image with a desired gain set by the user, so as to further improve the accuracy in defect detection and also further improve the visibility of the difference image.

It is preferred that a defect detection method according to a twenty-third aspect of the invention be configured in the twenty-second aspect such that the noise reduction degree with its setting accepted is multiplied by a reduction degree correction value proportional to a luminance value of the enlarged image in pixel units, and the gain, the setting of which was accepted, is multiplied by a gain correction value inversely proportional to the luminance value of the enlarged image in pixel units.

With such a configuration, it is possible to keep a luminance value of a signal and a luminance value of noise with regard to a defect image of the difference image constant even when lighting is varying during image-pickup by dynamically correcting the noise reduction degree and the gain based upon a luminance value of the enlarged image, so as to further improve the accuracy in defect detection.

It is preferred that a defect detection method according to a twenty-fourth aspect of the invention be configured in the sixteenth aspect such that a difference image generated by the difference calculation is made up of a positive difference image and a negative difference image, selection of at least one difference image between the positive difference image and the negative difference image is accepted, and the accepted difference image is selected.

With such a configuration, it is possible for the user to freely select at least one difference image between a positive difference image showing a bright defect image having a higher luminance value than the luminance value of the generated enlarged image (shading image) and a negative difference image showing a dark defect image having a lower luminance value than the same.

It is preferred that a defect detection method according to twenty-fifth aspect of the invention be configured in the twenty-fourth aspect such that the selected difference image is displayed.

With such a configuration, it is possible for the user to easily check from the displayed difference image whether or not a defect of a size not larger than the set size has been detected.

It is preferred that a defect detection method according to a twenty-sixth aspect of the invention be configured in the sixteenth aspect such that the larger the set image reduction ratio, the larger a filter size or the number of times of passage through the filter is set.

With such a configuration, it is possible to optimally set a filter size or the number of times of passage through the filter by calculation in accordance with the image reduction ratio.

It is preferred that a defect detection method according to a twenty-seventh aspect of the invention be configured in the sixteenth aspect such that the smaller the set image reduction ratio, the smaller a filter size or the number of times of passage through the filter is set.

With such a configuration, it is possible to optimally set a filter size or the number of times of passage through the filter by calculation in accordance with the image reduction ratio.

It is preferred that a defect detection method according to a twenty-eighth aspect of the invention be configured in the sixteenth aspect such that the larger the set defect size, the larger a filter size or the number of times of passage through the filter is set.

With such a configuration, it is possible to optimally set a filter size or the number of times of passage through the filter by calculation in accordance with the defect size.

It is preferred that a defect detection method according to a twenty-ninth aspect of the invention be configured in the sixteenth aspect such that the smaller the set defect size, the smaller a filter size or the number of times of passage through the filter is set.

With such a configuration, it is possible to optimally set a filter size or the number of times of passage through the filter by calculation in accordance with the defect size.

It is preferred that a defect detection method according to a thirtieth aspect of the invention be configured in the sixteenth aspect such that the filter size is decided in accordance with the set defect size.

With such a configuration, it is possible to optimally set a filter size in accordance with the defect size.

A computer program according to a thirty-first aspect of the invention has a configuration where a computer is configured to execute the processing of picking up an image of an object surface to acquire a multi-valued image; accepting setting of a size of a defect as a detection object; setting the accepted defect size; setting an image reduction ratio in accordance with the set defect size; generating a reduced image obtained by reducing the multi-valued image at the image reduction ratio; performing filter processing on the reduced image for removing a defect in the reduced image; generating an enlarged image obtained by enlarging the reduced image, subjected to the filter processing, at an image enlargement ratio corresponding to the reciprocal of the image reduction ratio; and generating a difference image obtained by performing a calculation of a difference between the multi-valued image and the enlarged image.

With such a configuration, without depending upon a change and a variation in generation state of shading included in a multi-valued image acquired by image-pickup, a shading image included in an enlarge image is made substantially consistent with a shading image included in the original multi-valued image by image reducing processing and image enlarging processing, and a defect image of a size not larger than a size set by the user is removed from a reduced image by filter processing for removing a defect, so that a defect of a size not larger than the size desired by the user can be highly accurately detected from an image of a difference between the original multi-valued image and the enlarged image.

A computer program according to a thirty-second aspect has a configuration where a computer is configured to execute the processing of picking up an image of an object surface to acquire a multi-valued image; displaying the multi-valued image; accepting a selection of an image corresponding to a defect as a detection object or a defect as a non-detection object from the displayed multi-valued image; setting a defect size corresponding to the accepted image; setting an image reduction ratio in accordance with the set defect size; generating a reduced image obtained by reducing the multi-valued image at the image reduction ratio; performing filter processing on the reduced image for removing a defect in the reduced image; generating an enlarged image obtained by enlarging the reduced image, subjected to the filter processing, at an image enlargement ratio corresponding to the reciprocal of the image reduction ratio; and generating a difference image obtained by performing a calculation of a difference between the multi-valued image and the enlarged image.

With such a configuration, a defect size is set only by the user selecting a defect image as a detection object or as a non-detection object from a displayed multi-valued image, and without depending upon a change and a variation in generation state of shading included in a multi-valued image acquired by image-pickup, a shading image included in an enlarge image is made consistent with a shading image included in the original multi-valued image by image reducing processing and image enlarging processing, and a defect image of a size not larger than a size set by the user is removed from a reduced image by filter processing for removing a defect, so that a defect of a size not larger than the size desired by the user can be highly accurately detected from an image of a difference between the original multi-valued image and the enlarged image.

According to the present invention, it is possible to provide a defect detection apparatus capable of highly accurately detecting a defect of a size not larger than a size desired by the user without depending upon a change and a variation in generation state of shading, a defect detection method employed in the defect detection apparatus, and a computer program for making a computer execute processing in the defect detection method.

BRIEF DESCRIPTION OF THE DRAWINGS

FIG. 9A is a view showing an example of a display screen in a case of selecting the positive difference image D'w; and FIG. 9B is a view showing a luminance distribution of the positive difference image D'w in amount of one line in the main scanning direction along line G-G' of FIG. 9A;

DETAILED DESCRIPTION OF THE PREFERRED EMBODIMENTS

Embodiments of the present invention are described below with reference to the drawings. It is to be noted that elements having the same or similar configurations or functions through the drawings referenced in description of each embodiment are provided with the same or similar numerals, and the detailed descriptions thereof are not given.

First Embodiment

Figure 1:
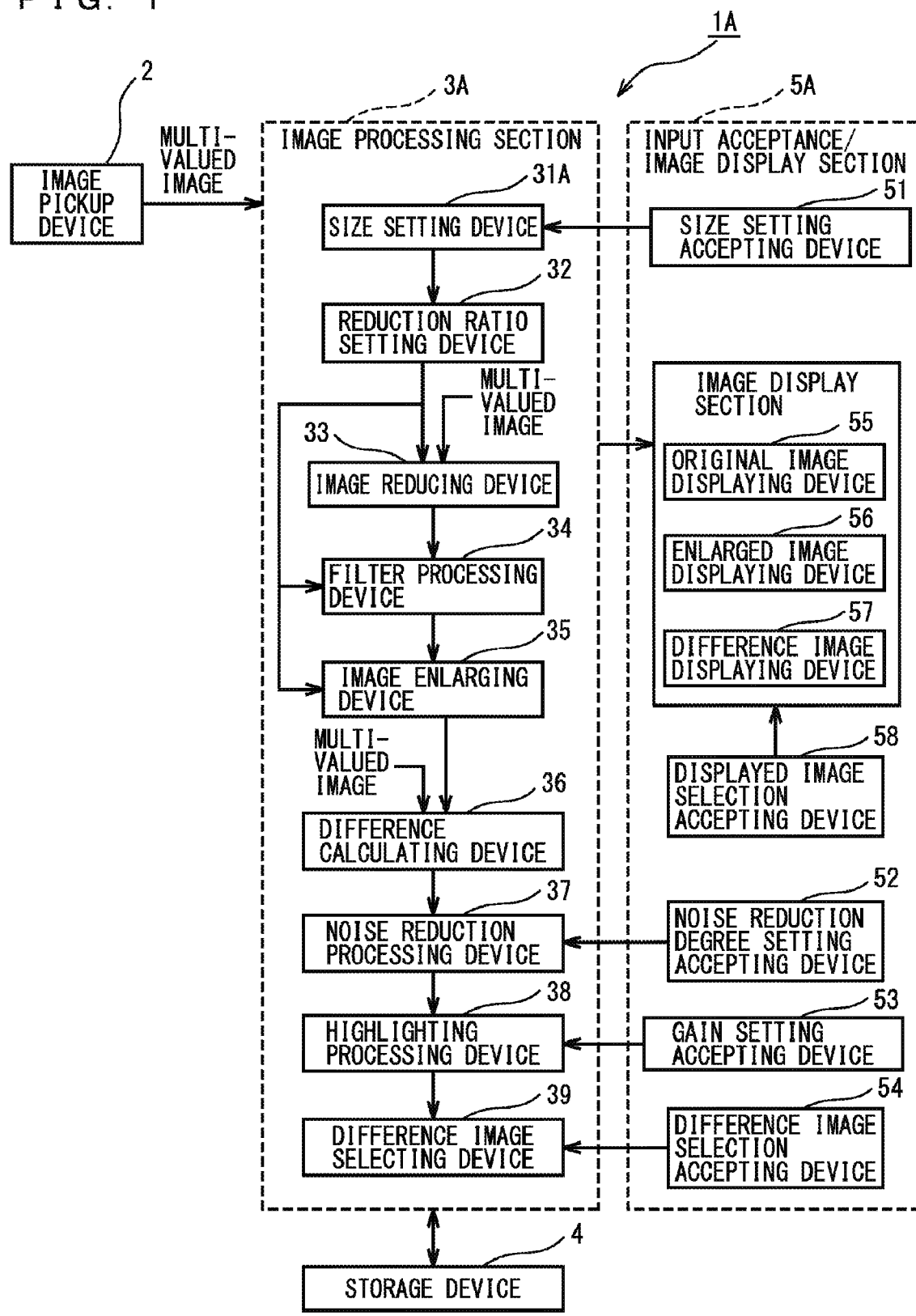
FIG. 1 is a block diagram showing a configuration of a defect detection apparatus according to a first embodiment of the present invention.

FIG. 1 is a block diagram showing a configuration example of a defect detection apparatus according to a first embodiment of the present invention.

In FIG. 1, a defect detection apparatus 1A according to the present first embodiment is configured of an image pickup device 2, an image processing section 3A, a storage device 4 and an input acceptance/image display section 5A.

The image pickup device 2 functions as a digital camera, for example. The image pickup device 2 picks up an image of a film surface, for example, as a detection object to acquire a multi-valued image, and outputs the image to the image processing section 3A.

The image processing section 3A includes a size setting device 31A, a reduction ratio setting device 32, an image reduction device 33, a filter processing device 34, an image enlarging device 35, a difference calculating device 36, a noise reduction processing device 37, a highlighting processing device 38, and a difference image selecting device 39. Further, the image processing section 3A is configured including a CPU, a ROM, a RAM, an external I/F, and the like, and controls processing operations of the size setting device 31A, the reduction ratio setting device 32, the image reduction device 33, the filter processing device 34, the image enlarging device 35, the difference calculating device 36, the noise reduction processing device 37, the highlighting processing device 38, and the difference image selecting device 39.

The storage device 4 functions as an image memory, and stores, as needed, an original multi-valued image picked up by the image pickup device 2 and an image after performance of each kind of processing in the image processing section 3A.

The input acceptance/image display section 5A is made up of a monitor, a mouse, a keyboard, and the like for a computer. The input acceptance section is provided, for example, on the display screen of the monitor as a dialog box, and includes a size setting accepting device 51, a noise reduction degree setting accepting device 52, a gain setting accepting device 53, a difference image selection accepting device 54, and a displayed image selection accepting device 58. The image display section is provided adjacent to the input acceptance section on the display screen of the monitor, and includes an original image displaying device 55, an enlarged image displaying device 56, and a difference image displaying device 57. The user can select any of the original multi-valued image, the enlarged image, and the difference image in the displayed image selection accepting device 58 and make the selected image displayed on the monitor screen.

Next, each configuration in the image processing section 3A is described.

The size setting device 31A sets a size of a defect, accepted from the user by the size setting accepting device 51 of the input acceptance/image display section 5A, into the reduction ratio setting device 32. Here, the "defect size" indicates the number of pixels corresponding to a diameter of a circle when the defect has a substantially circular shape, and indicates the number of pixels corresponding to the length of a short side of a rectangle when the defect has a substantially rectangular shape.

The reduction ratio setting device 32 sets an image reduction ratio with respect to the original multi-valued image acquired by the image pickup device 2, into the image reduction device 33 in accordance with the defect size set by the size setting device 31A. The reduction ratio setting device 32 is configured, for example, in the form of a reference table of an image reduction ratio with a defect size taken as an argument such that the larger (smaller) the defect size is, the larger (smaller) the image reduction ratio is set.

It is to be noted that the image reduction ratio is not necessarily calculated based upon the reference table, but may be calculated based upon a previously set defined calculation formula.

Further, the image reduction ratio described here ranges from, for example, 1/2 to 1/50. That "the image reduction ratio is large" defines, for example, 1/50 is a larger image reduction ratio than 1/2, whereas that "the image reduction ratio is small among them" means 1/2 is a smaller image reduction ratio than 1/50.

The image reduction device 33 performs processing using, for example, a technique which is called an area square method, and reduces the original multi-valued image at the image reduction ratio set by the reduction ratio setting device 32, to generate a reduced image. Here, the area square method is a technique in which, for example in a case of reducing an original multi-valued image of 4×4 pixels into 1/2 to generate a reduced image of 2×2 pixels, the original multi-valued image is divided into four blocks of 2×2 pixel, and a mean value of luminance values of the four pixels constituting each block is calculated to generate a reduced image of 2×2 pixels with the mean value of each block taken as one pixel value.

The filter processing device 34 functions as a secondary filter represented by a median filter, for example, and performs filter processing for removing a defect in the reduced image on the reduced image generated by the image reduction device 33. The filter processing device 34 is configured including a reference table of a filter size (or the number of times of passage through the filter) with a defect size (or image reduction ratio) taken as an argument such that the larger (smaller) the defect size (or image reduction ratio) is, the larger (smaller) the filter size or the number of times of passage through the filter is set. The filter processing device 34 removes a defect image of a size not larger than a size set by the user from the reduction image.

It is to be noted that the image reduction ratio is not necessarily calculated based upon the reference table, but may be calculated based upon a previously set defined calculation formula.

Here, the "filter size" indicates the number M of pixels constituting one side of two-dimensional filter of M×M pixels. Further, the median filter is a two-dimensional filter which replaces a pixel value of an attention pixel by a median value of pixel values of all pixels within a filter size range, and outputs the replaced value.

The image enlarging device 35 performs processing, using a technique which is called a bilinear interpolation method, for example, and enlarges the reduced image, subjected to the filter processing by the filter processing device 34, at an image enlargement ratio corresponding to the reciprocal of the image reduction ratio, to generate an enlarged image. The enlarged image corresponds to shading included in the original multi-valued image. Here, the bilinear interpolation method is an interpolation method in which linear interpolation is two-dimensionally enlarged and an interpolation value weighted averaged in accordance with a distance from each of the four pixels around one pixel to the interpolation object pixel is taken as a pixel value of the interpolation object pixel.

The difference calculating device 36 calculates a difference between the original multi-valued image and the enlarged image generated by the image enlarging device 35, to generate a difference image. The difference image is made up of a positive difference image showing a bright defect image with a high luminance value, and a negative difference image showing a dark defect image with a low luminance value with respect to a luminance value of the enlarged image (shading image) generated by the image enlarging device 35.

The noise reduction processing device 37 subtracts or adds a noise reduction degree (the number of gradations) accepted from the user by the noise reduction degree setting accepting device 52 of the input acceptance/image display section 5A to or from the difference image generated by the difference calculating device 36, to generate a noise-reduction-processed image. This can improve the accuracy in defect detection and improve the visibility of the difference image.

The highlighting processing device 38 multiplies the noise-reduction-processed image generated by the noise reduction processing device 37 by a gain (magnification) accepted from the user by the gain setting accepting device 53 of the input acceptance/image display section 5A, to generate a highlighting-processed image. This can further improve the accuracy in defect detection and further improve the visibility of the difference image.

The difference image selecting device 39 selects at least one difference image between the positive difference image and the negative difference image, subjected to the noise reduction processing and the highlighting processing by the noise reduction processing device 37 and the highlighting processing device 38, in accordance with the selection of the difference image accepted from the user by the difference image selection accepting device 54 of the input acceptance/image display section 5A.

Figure 2:
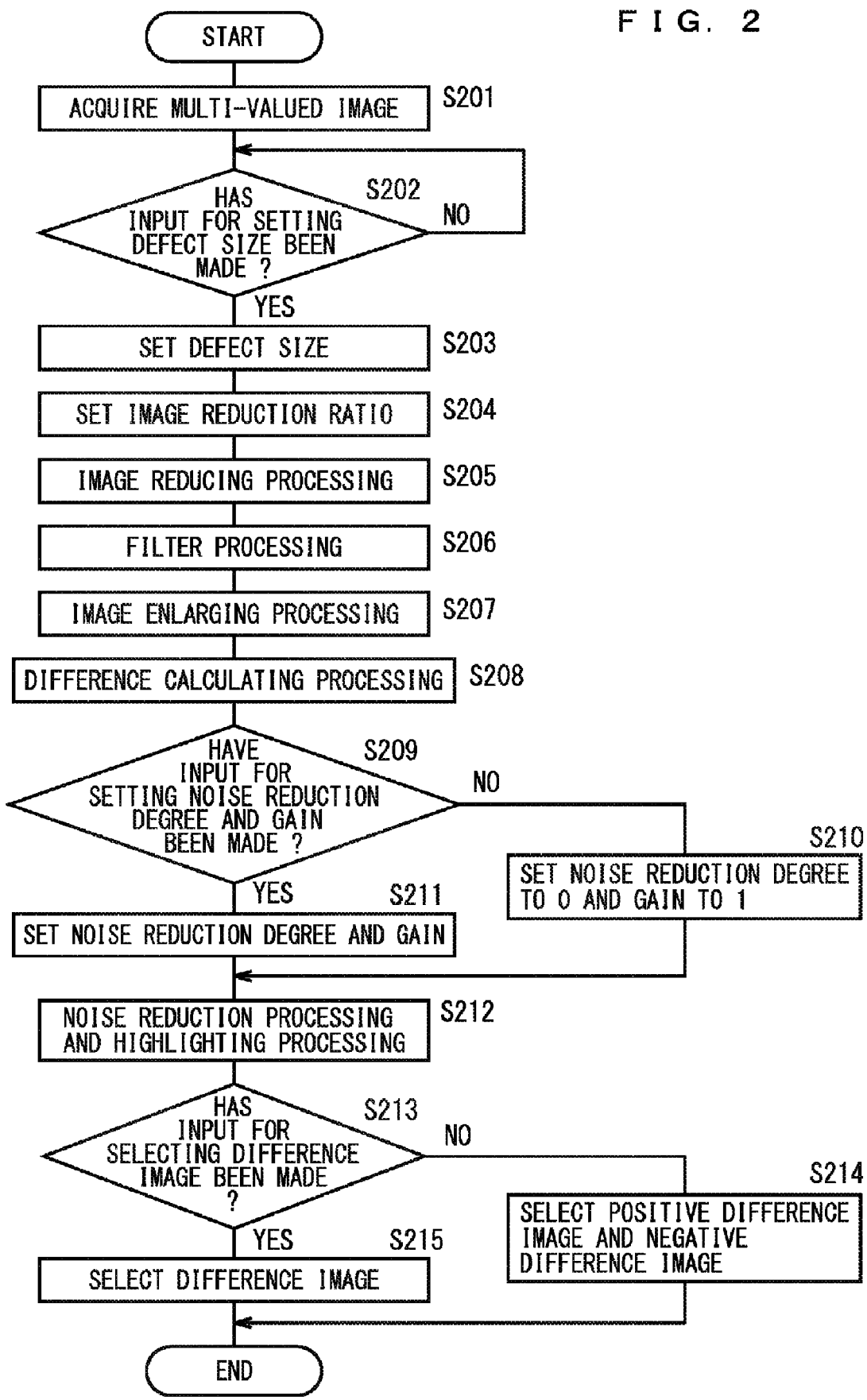
FIG. 2 is a flowchart showing each processing process of a defect detection method according to the first embodiment of the present invention.

FIG. 2 is a flowchart showing each processing process of a defect detection method according to the present invention which is employed in the defect detection apparatus 1A according to the present first embodiment. Each processing process of the defect detection method according to the present invention is executed in accordance with a computer program according to the present invention which is stored inside the image processing section 3A.

In FIG. 2, first, the image processing section 3A acquires a multi-valued image of an object surface by image-pickup (step S201). Next, the image processing section 3A determines whether or not an input for setting a defect size (the number of pixels) has been made by the user (step S202), and when the defect size setting input has been made (step S202: YES), the image processing section 3A sets a defect size (step S203).

Next, the image processing section 3A sets an image reduction ratio in accordance with the set defect size (step S204), and reduces the acquired multi-valued image at the set image reduction ratio, to generate a reduced image (step S205). Next, the image processing section 3A performs the filter processing on the reduced image in a filter size (or the number of times of passages through the filter) in accordance with the image reduction ratio (or defect size) (step S206).

It is necessary to remove a defect as the object during performance of the image reduction processing and the filter processing. It is thereby possible to ultimately extract the defect when a difference is taken between the original multi-valued image and an image obtained by enlarging the reduced image (with the defect removed) to the size of the original multi-valued image.

The relation of a formula (1) is formed among the size of a removable defect, the image reduction ratio, and the median filter size. That is, when the reduction ratio is 1/R and the median filter size is M, the size of the removable defect can be obtained using the formula (1).

$$\text{RoundDown}(M/2) \times R \qquad (1)$$

Since the median filtering is processing for replacing an attention pixel by a median value out of density values of all pixels within a filter size range, a defect having a width of at least not larger than the half of the filter size M, namely a width smaller than RoundDown(M/2), is replaced by a median value and then removed. Further, since the median filtering is performed on the reduced image, the width for the removal can be converted into a width on the original image, to calculate a size of an actually removable defect. The width on the original image may be calculated by multiplying the width on the reduced image by the reciprocal of the reduction ratio, and hence can be calculated using the formula as described above. For example, when the reduction ratio is set to 1/4 and the filter size is set to 5, the size of the removable defect is not larger than eight pixels.

Based upon the above relation among the size of the removable defect, the image reduction ratio and the median filter size, a method for calculating an appropriate image reduction ratio and filter size from a size of a defect wished to be ultimately extracted by the user is described below.

It is to be noted that, with the image reduction ratio made larger, the processing can be performed at higher speed, but it then causes larger distortion of the image, and the accuracy in generation of a shading image thus tends to become lower. Further, with the filter size made larger, the defect can be removed on the reduced image to hold the accuracy of the shading image, while the image reduction ratio is less required to be large (the image is less distorted), but then the processing time tends to become longer. Hence it is necessary to select an appropriate image reduction ratio and filter size in accordance with an environment where these are used. Three cases are described below.

(i) Case of Fixing Filter Size

This is a method for use in a case of prioritizing processing speed, in which the filter size is fixed to be rather small, and the reduction ratio is varied so that a variety of defect sizes can be handled.

For example, in a case of fixing the median filter size to 5, when the image reduction ratio 1/R is decided using the following calculation formula from a size S of a defect wished to be extracted by the user, it is possible to remove a defect as the object from the reduced image. First, a width H of a defect removable by use of a 5×5 median filter can be obtained using a formula (2).

$$H = \text{RoundDown}(5/2) = 2 \qquad (2)$$

That is, a defect having a width not larger than two pixels on the reduced image can be removed by use of the 5×5 median filter. Hence image reduction may be performed such that the width of the defect size S on the reduced image has a size not larger than two pixels. Therefore, the reduction ratio 1/R is calculated using a formula (3). It is to be noted that the formula (3) is a formula for obtaining the reciprocal of the reduction ratio.

$$R = \text{RoundUp}(S/H) = \text{RoundUp}(S/2) \qquad (3)$$

For example, in a case of setting 15 pixels as the defect size S, the image reduction ratio 1/R required for the removal is 1/8.

(ii) Case of Fixing Image Reduction ratio

This is a method for use in a case of prioritizing the accuracy in shading image generation, in which the image reduction ratio is previously fixed to a degree having no influence on the processing speed, and filter size is varied so that a variety of defect sizes can be handled.

For example, in a case of fixing the image reduction ratio to 1/4, when the filter size M is decided using the following calculation formula from the defect size S wished to be extracted by the user, it is possible to remove a defect as the object from the reduced image.

First, by performing the image reduction, the defect size S is converted into a size not larger than a size H obtained using a formula (4) on the reduced image.

$$H=\text{RoundUp}(S/R)=\text{RoundUp}(S/4) \quad (4)$$

A defect of the obtained size H can be removed by a median filter of a filter size M not smaller than double the size H, as shown in a formula (5).

$$M=H\times 2+1 \quad (5)$$

For example, when 15 pixels are set as the defect size S, the size H on the reduced image is not larger than four pixels, and the filter size required for the removal is 9.

(iii) Case of Varying Both Filter Size and Image Reduction Ratio

This is a technique taken in a case of achieving good processing speed and accuracy, in which the filter size M and the image reduction ratio 1/R are increased by degrees in accordance with the increase in defect size S wished to be extracted by the user so that a variety of defect sizes can be handled.

The filter size M and the image reduction ratio 1/R are calculated from the defect size S, using a formula (6). It should be noted that in the formula (6), the reciprocal of the reduction ratio is obtained as the image reduction ratio.

$$M=\text{Max}(\text{RoundUp}((\text{Sqrt}(S)-3)/2),0)\times 2+3$$

$$R=\text{RoundUp}(S/\text{RoundDown}(M/2)) \quad (6)$$

In the formula (6), Max(x, y) means a calculation for obtaining a larger value between "x" and "y", Sqrt(x) means a calculation for obtaining a square of "x", RoundUp(x) means a calculation for rounding up a figure after the decimal point of "x", and RoundDown(x) means a calculation for rounding down a figure after the decimal point of "x". For example, when 10 pixels are set by the user as the defect size S, the filter size M is five pixels and the image reduction ratio 1/R is 1/5.

According to the methods as thus described, it is possible for the user to generate an appropriate reduced image with a defect removed therefrom only by inputting a size of the defect, the image of which has been picked up and which is wished to be extracted, without being aware of the image reduction ratio and the filter size. It is to be noted that these calculations may held in the form of a reference table with the defect size S taken as an argument, or may be made each time by use of the calculation formula.

Next, the image processing section 3A enlarges the reduced image, subjected to the filter processing, at the image enlargement ratio R corresponding to the reciprocal of the image reduction ratio 1/R, to generate an enlarged image (shading image) (step S207). Next, the image processing section 3A performs a calculation of a difference between the original multi-valued image and the enlarged image, to generate as difference images a positive difference image (bright defect image) and negative difference image (dark defect image) (step S208).

Figure 3A:
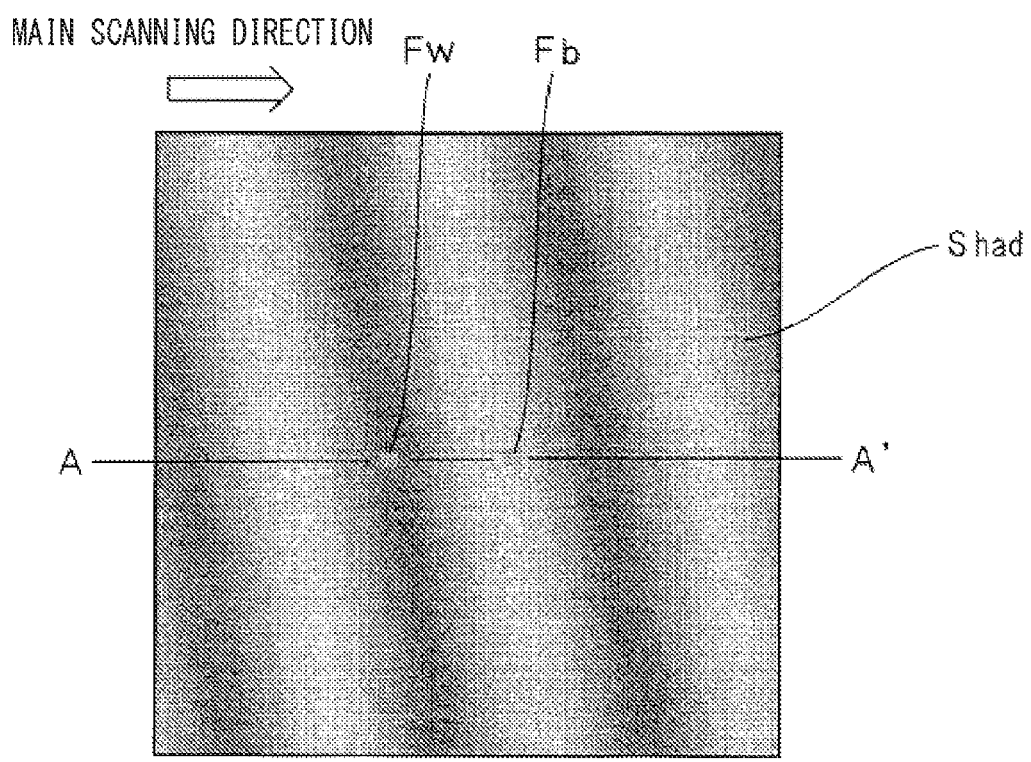
FIG. 3A is a view showing an example of a display screen of an original multi-valued image.
Figure 3B:
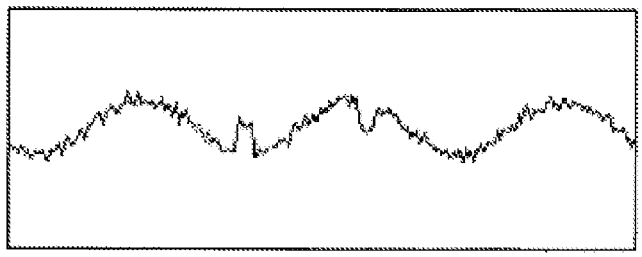
FIG. 3B is a view showing a luminance distribution of a bright defect image Fw, a dark defect image Fb, and a shading image Shad in amount of one line in a main scanning direction along line A-A' of FIG. 3A.

FIG. 3A is a view showing an example of a display screen of the original multi-valued image; and FIG. 3B is a view showing a luminance distribution of a bright defect image Fw, a dark defect image Fb, and a shading image Shad in amount of one line in a main scanning direction along line A-A' of FIG. 3A. As shown in FIGS. 3A and 3B, the original multi-valued image includes the shading image Shad that is generated by image-pickup by use of an optical system.

Figure 4A:
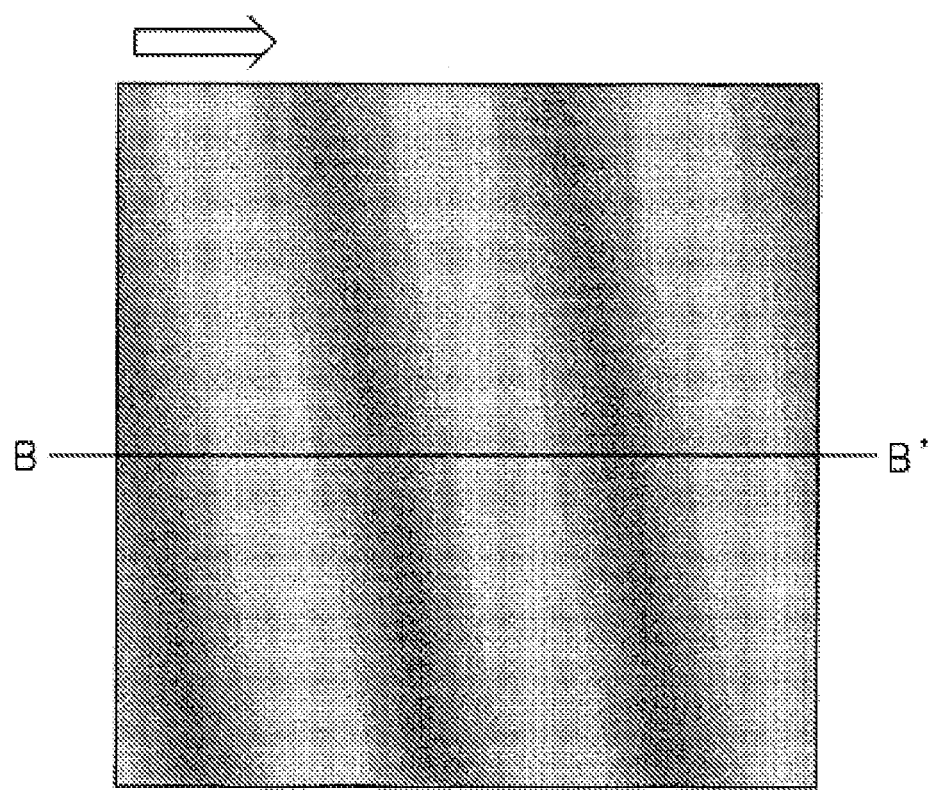
FIG. 4A is a view showing an example of a display screen of an expanded image generated by reducing the original multi-valued image at an image reduction ratio of 1/4, performing median-filter processing, and enlarging the image at an image enlargement ratio of 4.
Figure 4B:
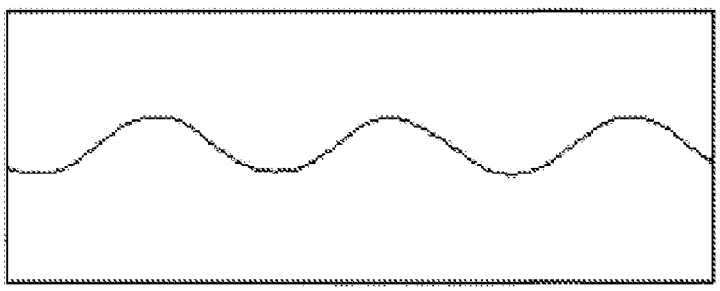
FIG. 4B is a view showing a luminance distribution of the enlarged image in amount of one line in the main scanning direction along line B-B' of FIG. 4A.

FIG. 4A is a view showing an example of a display screen of an expanded image generated by reducing the original multi-valued image at an image reduction ratio of 1/4, performing median-filter processing, and enlarging the image at an image enlargement ratio of 4; and FIG. 4B is a view showing a luminance distribution of the enlarged image in amount of one line in the main scanning direction along line B-B' of FIG. 4A. As shown in FIGS. 4A and 4B, the enlarged image has a shape consistent with the shading image Shad in the FIGS. 3A and 3B.

Figure 5A:
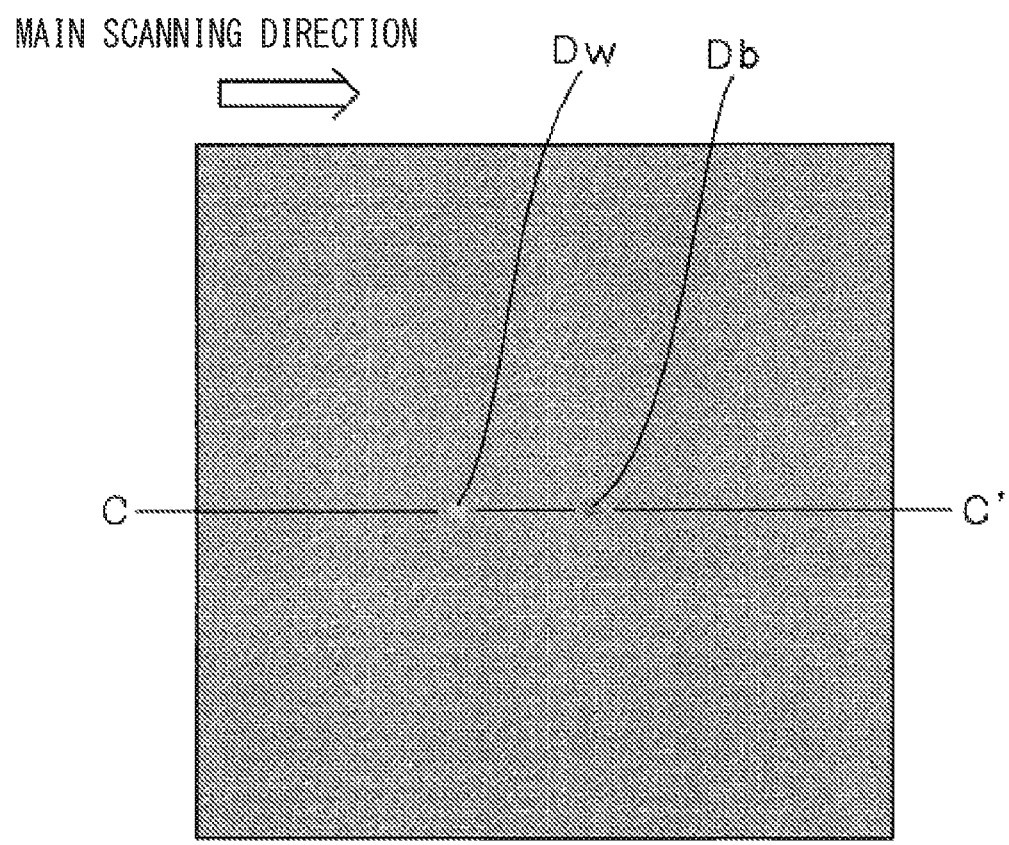
FIG. 5A is a view showing an example of a display screen of a positive difference image (bright defect image) Dw and a negative difference image (dark defect image) Db, generated by performing a calculation of a difference between the original multi-valued image and the enlarged image.
Figure 5B:
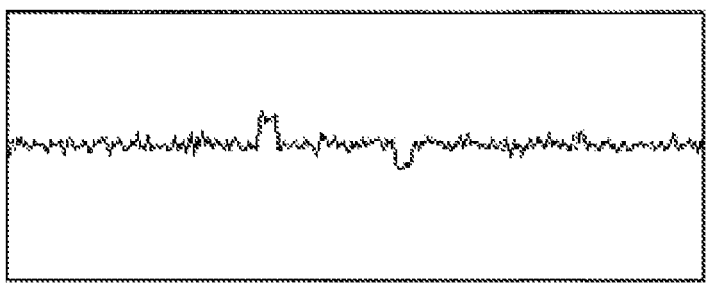
FIG. 5B is a view showing a luminance distribution of the positive difference image (bright defect image) Dw and the negative difference image (dark defect image) Db in amount of one line along line C-C' of FIG. 5A.

FIG. 5A is a view showing an example of a display screen of a positive difference image (bright defect image) Dw and a negative difference image (dark defect image) Db, generated by performing a calculation of a difference between the original multi-valued image and the enlarged image; and FIG. 5B is a view showing a luminance distribution of the positive difference image (bright defect image) Dw and the negative difference image (dark defect image) Db in amount of one line in the main scanning direction along line C-C' of FIG. 5A. As shown in FIGS. 5A and 5B, the shading image included in the original multi-valued image has been removed, and only the bright defect image Dw and the dark defect image Db have been detected. In addition, in FIGS. 5A and 5B, a value of ±0 as a boundary of the positive and negative in the difference image is expressed as a median luminance value.

With reference again to FIG. 2, the image processing section 3A determines whether or not input for setting a noise reduction degree (the number of gradations) and a gain (magnification) in the generated positive difference image and negative difference image have been made by the user (step S209). When the input for setting the noise reduction degree (the number of gradations) and the gain (magnification) have not been made (step S209: NO), the image processing section 3A sets the noise reduction degree to 0 as a default, and sets the gain to 1 (step S210). On the other hand, when the input for setting the noise reduction degree (the number of gradations) and the gain (magnification) have been made (step S209: YES), the image processing section 3A sets a noise reduction degree and a gain which were specified by the user (step S211).

Next, the image processing section 3A performs noise reduction processing and the highlighting processing on the generated positive difference image and negative difference image by use of the set noise reduction degree and gain (step S212). Here, when the noise reduction degree is N, the gain is G, a difference value of the generated difference image is D(i, j) ((i, j) shows a coordinate position on the image), and when the difference value after performance of the noise reduction processing and the highlighting processing is D'(i, j), the difference value D'(i, j) is given by a formula (7).

$$D'(i,j)=\text{Max}(D(i,j)-N,0)\times G$$

(in a case of D(i, j) being positive)

$$D'(i,j)=\text{Min}(D(i,j)+N,0)\times G \quad (7)$$

(in a case of D(i, j) being negative)

It is to be noted that in the formula (7), Min(x, y) means a calculation for obtaining a smaller one between "x" and "y".

Further, different noise reduction degrees and gains can be set in the positive difference image and the negative difference image. Hence, in a case where allowable values with respect to a defect are different, in a case where one is wished to be highlighted more, or in some other case, the user can freely make adjustments. Here, when the noise reduction degree is Nw and the gain is Gw with respect to the positive difference image and the noise reduction degree is Nb and the gain is Gb with respect to the negative difference image, the difference value D'(i, j) after performance of the noise reduction processing and the highlighting processing is given by a formula (8).

$$D'(i,j) = \text{Max}(D(i,j)-Nw, 0) \times Gw$$

(in a case of D(i, j) being positive)

$$D'(i,j) = \text{Min}(D(i,j)+Nb, 0) \times Gb \quad (8)$$

(in a case of D(i, j) being negative)

Figure 6A:
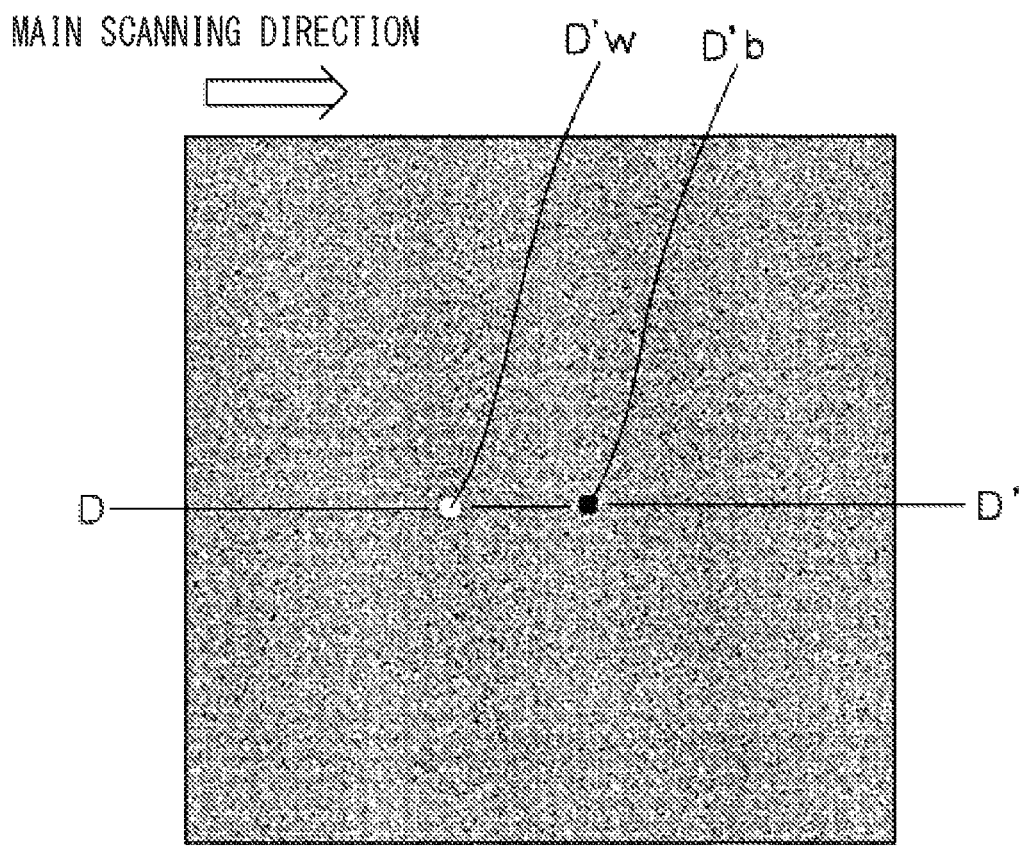
FIG. 6A is a view showing an example of a display screen of the positive difference image D'w and the negative difference image D'b after highlighting processing in a case of setting a reduction degree N of noise to 0 and a gain G to 5.
Figure 6B:
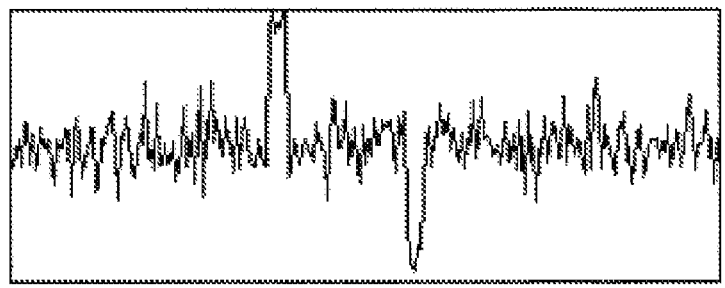
FIG. 6B is a view showing a luminance distribution of the positive difference image D'w and the negative difference image D'b after the highlighting processing in amount of one line in the main scanning direction along line D-D' of FIG. 6A.
Figure 7A:
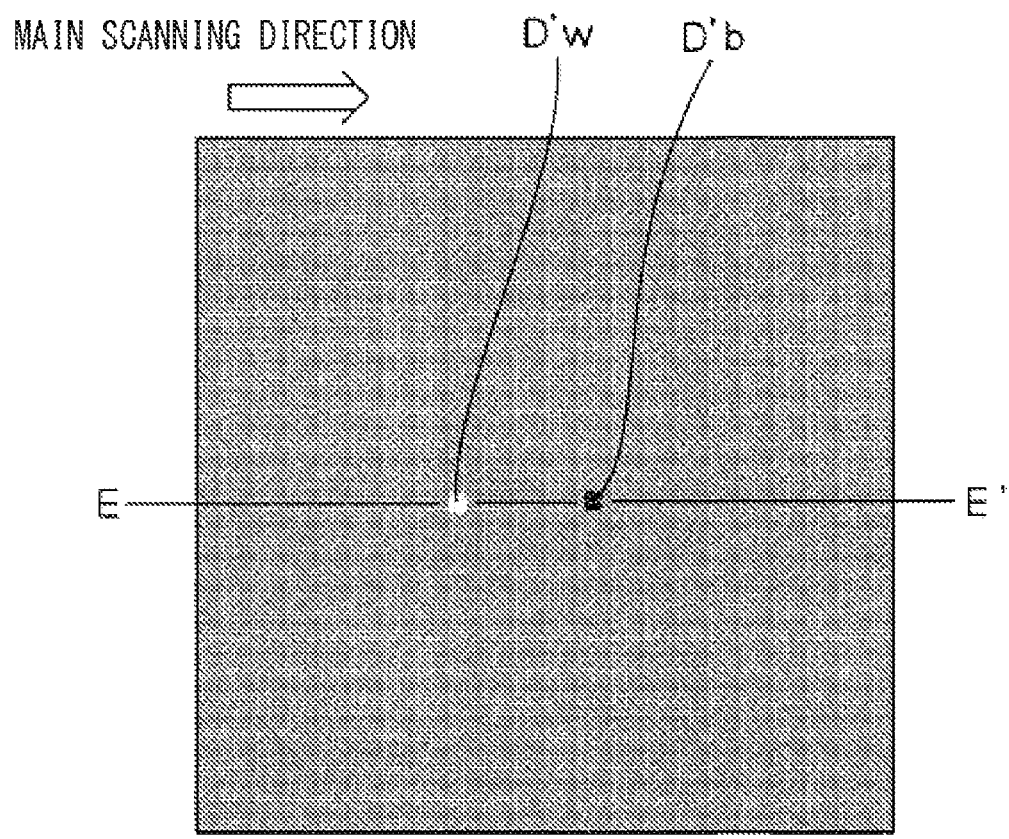
FIG. 7A is a view showing an example of a display screen of the positive difference image D'w and the negative difference image D'b after noise reduction processing and the highlighting processing in a case of setting the reduction degree N of noise to 10 and the gain G to 5.
Figure 7B:
FIG. 7B is a view showing a luminance distribution of the positive difference image D'w and the negative difference image D'b after the noise reduction processing and the highlighting processing in amount of one line in the main scanning direction along line E-E' of FIG. 7A.

FIG. 6A is a view showing an example of a display screen of the positive difference image D'w and the negative difference image D'b after the highlighting processing in a case of setting a reduction degree N of noise to 0 and a gain G to 5; and FIG. 6B is a view showing a luminance distribution of the positive difference image D'w and the negative difference image D'b after the highlighting processing in amount of one line in the main scanning direction along line D-D' of FIG. 6A. FIG. 7A is a view showing an example of a display screen of a positive difference image D'w and a negative difference image D'b after the noise reduction processing and the highlighting processing in a case of setting the reduction degree N of noise to 10 and the gain G to 5; and FIG. 7B is a view showing a luminance distribution of the positive difference image D'w and the negative difference image Db after the noise reduction processing and the highlighting processing in amount of one line in the main scanning direction along line E-E' of FIG. 7A;

Next, the image processing section 3A determines whether or not an input for selecting at least one difference image between the positive difference image and the negative difference image has been made by the user (step S213), and when the input for selecting the difference image has not been made (step S213: NO), the image processing section 3A selects the positive difference image and the negative difference image as defaults (step S214), and completes the processing. On the other hand, when the input for selecting at least one difference image between the positive difference image and the negative difference image has been made (step S213: YES), the image processing section 3A selects the difference image specified by the user (step S215), and completes the processing.

When the image data is an eight-bit data and a result of the difference image selecting processing is Z(i, j), the selection processing is performed by a clipping calculation expressed by a formula (9).

$$Z(i,j) = \text{Clip}(D'(i,j), 0, 255)$$

(in a case of selecting the positive difference image)

$$Z(i,j) = \text{Clip}(D'(i,j), +255, 0, 255)$$

(in a case of selecting the negative difference image)

$$Z(i,j) = \text{Clip}(D'(i,j), +128, 0, 255) \quad (9)$$

(in a case of selecting both the positive and negative difference images)

It should be noted that in the formula (9), Clip(n, x, y) means that "x" is selected in a case of n<x, "y" is selected in a case of n>y, and "n" is selected in a case of x≦n≦y.

Figure 8A:
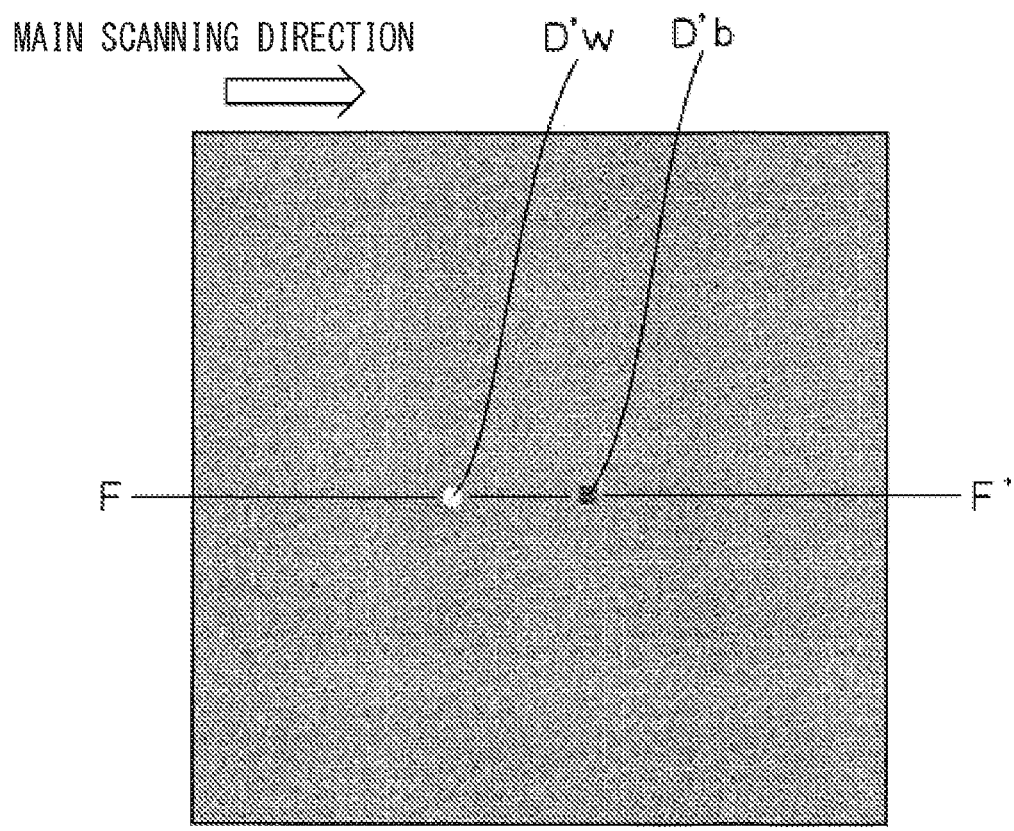
FIG. 8A is a view showing an example of a display screen in a case of selecting the positive difference image D'w and the negative difference image D'b.
Figure 8B:
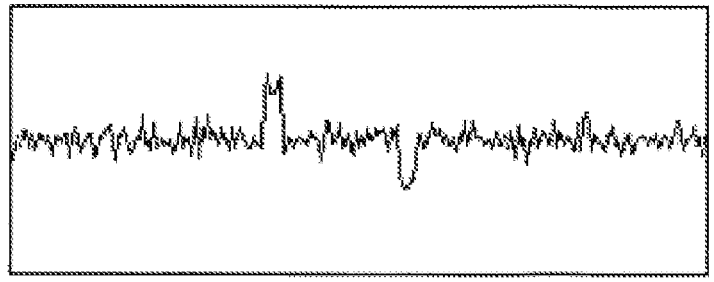
FIG. 8B is a view showing a luminance distribution of the positive difference image D'w and the negative difference image D'b in amount of one line in the main scanning direction along line F-F' of FIG. 8A.
Figure 10A:
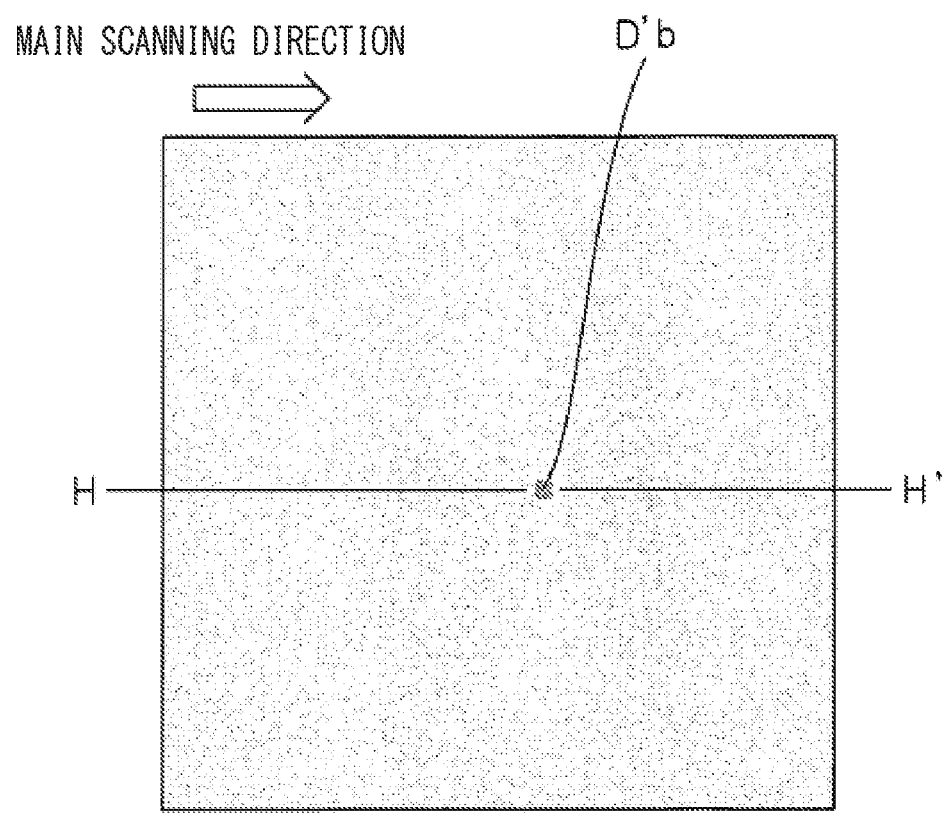
FIG. 10A is a view showing an example of a display screen in a case of selecting the negative difference image D'b.
Figure 10B:
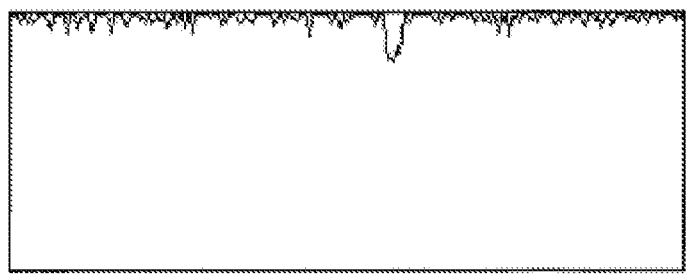
FIG. 10B is a view showing a luminance distribution of the negative difference image D'b in amount of one line in the main scanning direction along line H-H' of FIG. 10A.

FIG. 8A is a view showing an example of a display screen in the case of selecting the positive difference image D'w and the negative difference image D'b; and FIG. 8B is a view showing a luminance distribution of the positive difference image D'w and the negative difference image D'b in amount of one line in the main scanning direction along line F-F' of FIG. 8A. FIG. 9A is a view showing an example of a display screen in the case of selecting the positive difference image D'w; and FIG. 9B is a view showing a luminance distribution of the positive difference image D'w in amount of one line in the main scanning direction along line G-G' of FIG. 9A. FIG. 10A is a view showing an example of a display screen in the case of selecting the negative difference image D'b; and FIG. 10B is a view showing a luminance distribution of the negative difference image D'b in amount of one line in the main scanning direction along line H-H' of FIG. 10A.

As thus described, according to the present first embodiment, without depending upon a change and a variation in generation state of shading included in a multi-valued image acquired by image-pickup by the image pickup device 2, a shading image included in an enlarge image is made substantially consistent with a shading image included in the original multi-valued image by the image reduction device 33 and the image enlarging device 35, and a defect image of a size not larger than a size set by the user is removed from a reduced image by the filter processing device 34, so that a defect of a size not larger than the size desired by the user can be highly accurately detected from an image of a difference between the original multi-valued image and the enlarged image. Further, only a defect in one color (light or dark) desired by the user can also be extracted by the difference image selecting device 39.

Second Embodiment

Figure 11:
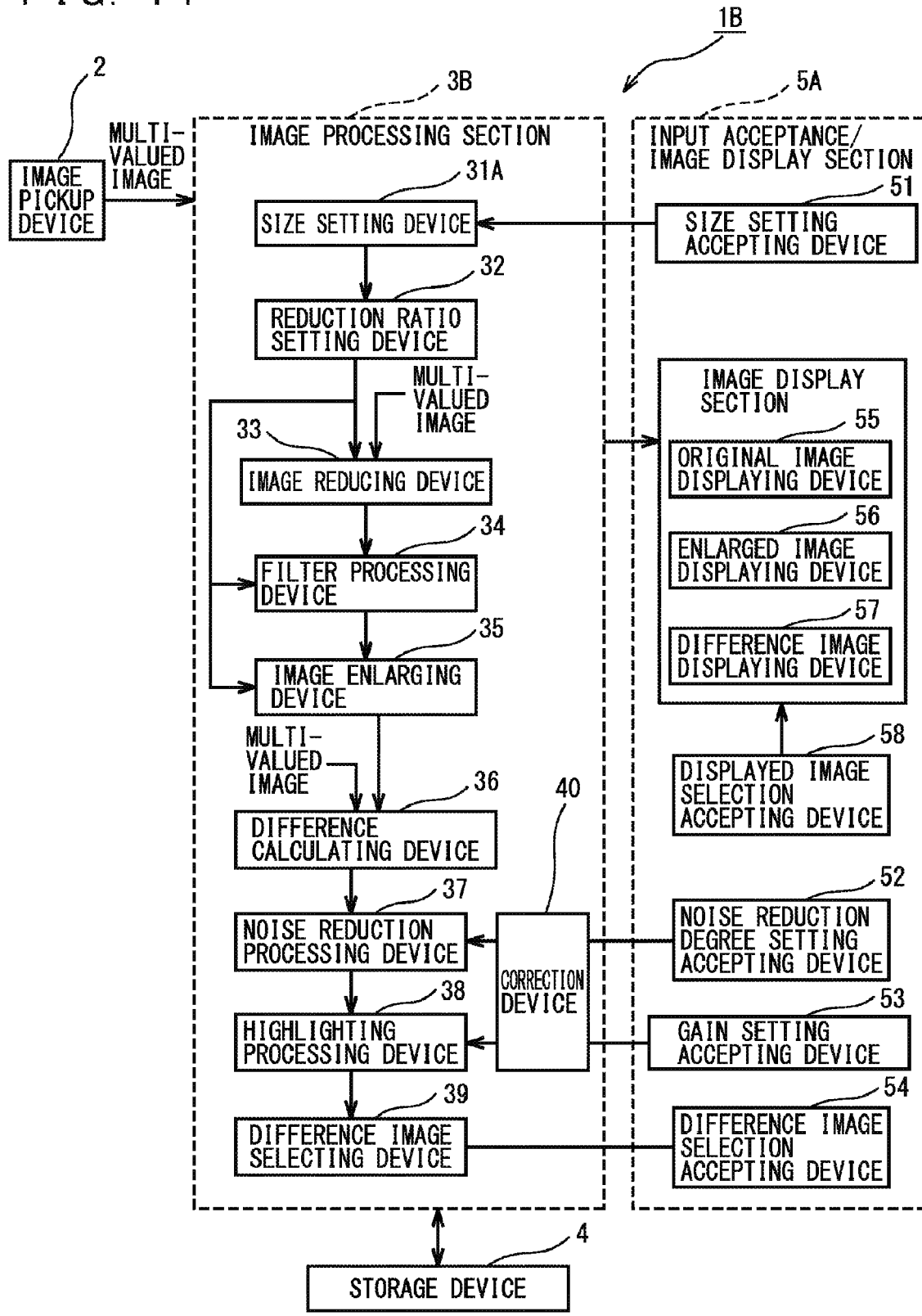
FIG. 11 is a block diagram showing a configuration example of a defect detection apparatus according to a second embodiment of the present invention.
Figure 12:
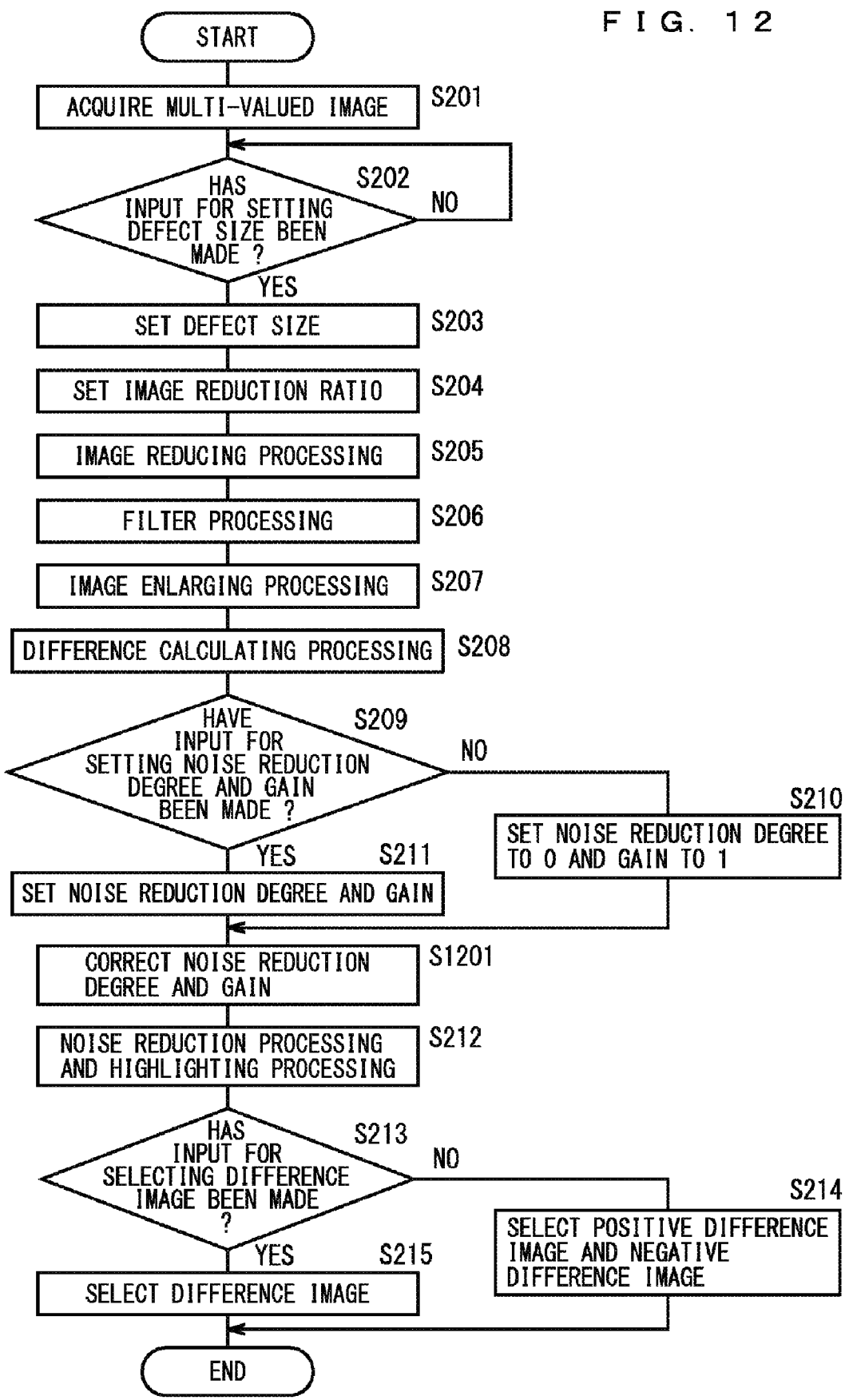
FIG. 12 is a flowchart showing each processing process of a defect detection method according to the present invention which is employed in the defect detection apparatus according to the present second embodiment.

FIG. 11 is a block diagram showing a configuration example of a defect detection apparatus according to a second embodiment of the present invention, and FIG. 12 is a flowchart showing each processing process of a defect detection method according to the present invention which is employed in the defect detection apparatus according to the present second embodiment. Each processing process of the defect detection method according to the present invention is executed by a computer program according to the present invention stored inside an image processing section 3B.

In FIG. 11, a defect detection apparatus 1B according to the present second embodiment is configured of an image pickup device 2, an image processing section 3B, a storage device 4, and an input acceptance/image display section 5A.

It is to be noted that the present second embodiment is different from the first embodiment in that the image processing section 3A of the present first embodiment is added with a correction device 40 to form the image processing section 3B. Further, in FIG. 12, the defect detection method of the present second embodiment is different from that of the first embodiment in that the processing processes of FIG. 2 referenced in the first embodiment is added with a processing process for collecting a noise reduction degree and a gain (step S1201). The different points are mainly described below.

In FIG. 11, the correction device 40 multiplies the noise reduction degree N, the setting of which was accepted by the noise reduction degree setting accepting device 52, by a reduction degree correction value proportional to the luminance value of the enlarged image in pixel units, and multiplies the gain G, the setting of which was accepted by the gain setting accepting device 53, by a gain correction value inversely proportional to the luminance value of the enlarged image in pixel units, to output a corrected reduction degree N' and a corrected gain G'. The noise reduction processing device 37 reduces noise from a difference image at the corrected reduction degree N', to generate a noise reduction processing image. The highlighting processing device 38 multiplies the noise reduction processing image by the corrected gain to generate a highlighting processing image.

Here, on the image picked up by the camera, a ratio of a signal to noise is assumed to be constant, and the reduction degree correction value and the gain correction value are decided such that outputs of the signal and the noise are constant even when a difference in contrast has occurred within one screen due to the influence of shading or the like caused by lighting or even when the brightness of the lighting changes. In a case of the image data being eight-bit data and the luminance value of the enlarged image being a luminance value L(i, j), the reduction degree correction value is L(i, j)/128, the gain correction value is 128/L(i, j), and the corrected reduction degree N' and the corrected gain G' are given by a formula (10).

$$N'=N\times L(i,j)/128$$

$$G'=G\times 128/L(i,j) \quad (10)$$

In FIG. 12, the image processing section 3B dynamically corrects the noise reduction degree and the gain based upon the luminance value of the enlarged image (step S1201). As for the noise reduction degree, the higher the luminance value in a position of an attention pixel in the enlarged image, the larger the noise reduction degree is made assuming that an output of noise in the attention position also becomes larger, and the lower the luminance value, the smaller the noise reduction degree is made assuming that an output of noise in the attention position also becomes smaller.

Meanwhile, as for the gain, the higher the luminance value in the position of the attention pixel in the enlarged image, the smaller the gain is made assuming that an output of a signal in the attention position also becomes larger, and the lower the luminance value, the larger the gain is made assuming that an output of a signal in the attention position also becomes smaller. Thereby, even when a difference in contrast has occurred within one screen due to the influence of shading or the like caused by lighting or even when the brightness of the lighting at the time of image pickup has varied, it is possible to hold luminance values of signals and luminance values of noises with regard to the defect image of the difference image constant, so as to further improve the accuracy in defect detection.

Figures 13A, 13B, 13C:
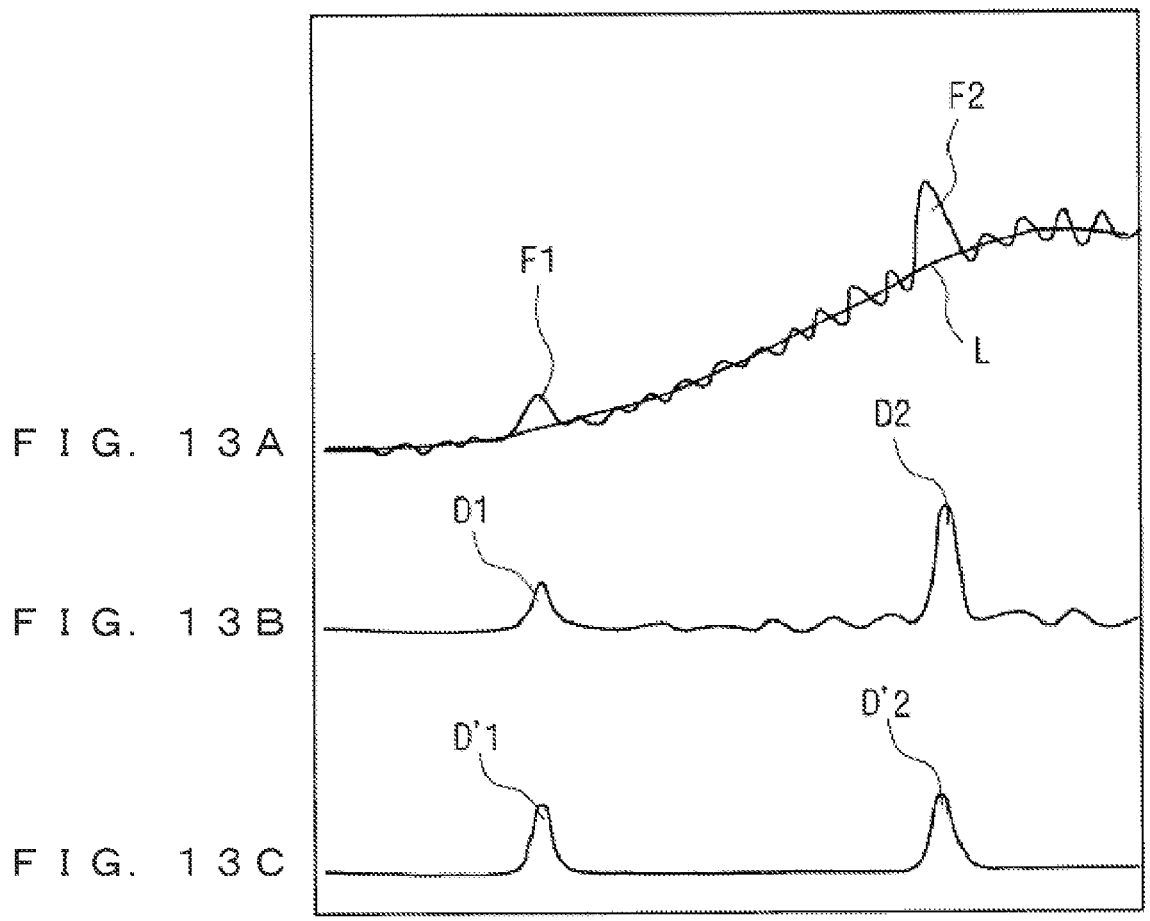
FIGS. 13A, 13B and 13C are view showing the relation between a curve L showing a luminance distribution of an enlarged image (shading image) by lighting and a luminance distribution of a difference image subjected to the noise reduction processing and the highlighting processing by use of a corrected reduction degree and a corrected gain.

FIGS. 13A, 13B and 13C are view showing the relation between a curve L showing a luminance distribution of an enlarged image (shading image) by lighting and a luminance distribution of a difference image subjected to the noise reduction processing and the highlighting processing by use of a corrected reduction degree and a corrected gain. FIG. 13A is a view representing a condition of a luminance distribution of an image in which defect portions F1 and F2 having the same luminance values inherently (in a case of being free of the influence of shading) were picked up with different luminance changes since the difference in contrast has occurred within one screen due to the influence of shading or the like caused by lighting.

In a case where such an image is processed with a uniform noise reduction degree and a uniform gain applied thereto, since the signal (luminance value of the defect) and the noise are large in a portion of a high luminance value and the signal (luminance value of the defect) and the noise are small in a portion of a low luminance value, defects having the same luminance value inherently (in the case of being free of the influence of shading) are undesirably detected as defects having different luminance values while keeping the difference in contrast. Further, a difference image with a larger noise component is generated on the periphery of the defect F2 than that on the periphery of the defect F1. FIG. 13B shows a difference image in a case of being processed using a uniform noise reduction degree and a uniform gain. As shown in FIG. 13B, the result of the processing is that "D2" corresponding to the periphery of the detect portion F2 has a larger noise component than "D1" corresponding to the periphery of the detect portion F1.

On the other hand, in a case where an image is processed while the noise reduction degree and the gain are corrected in accordance with the luminance distribution of the enlarged image (shading image), since the processing is performed while the noise reduction degree is corrected to be smaller and the gain is corrected to be larger on the periphery of the detect portion F1 and the noise reduction degree is corrected to be larger and the gain is corrected to be smaller on the periphery of the detect portion F2, it is possible to make final outputs of a signal luminance value of the defect) and noise on the periphery of the detect portion F1 at the same level as those on the periphery of the detect portion F2. FIG. 13C shows a difference image when processed using the dynamically corrected noise reduction degree and gain. As shown in FIG. 13C, "D'2" corresponding to the periphery of the detect portion F2 has a signal (luminance value of the defect) and a noise component at the same level as "D1" corresponding to the periphery of the detect portion F1.

Third Embodiment

Figure 14:
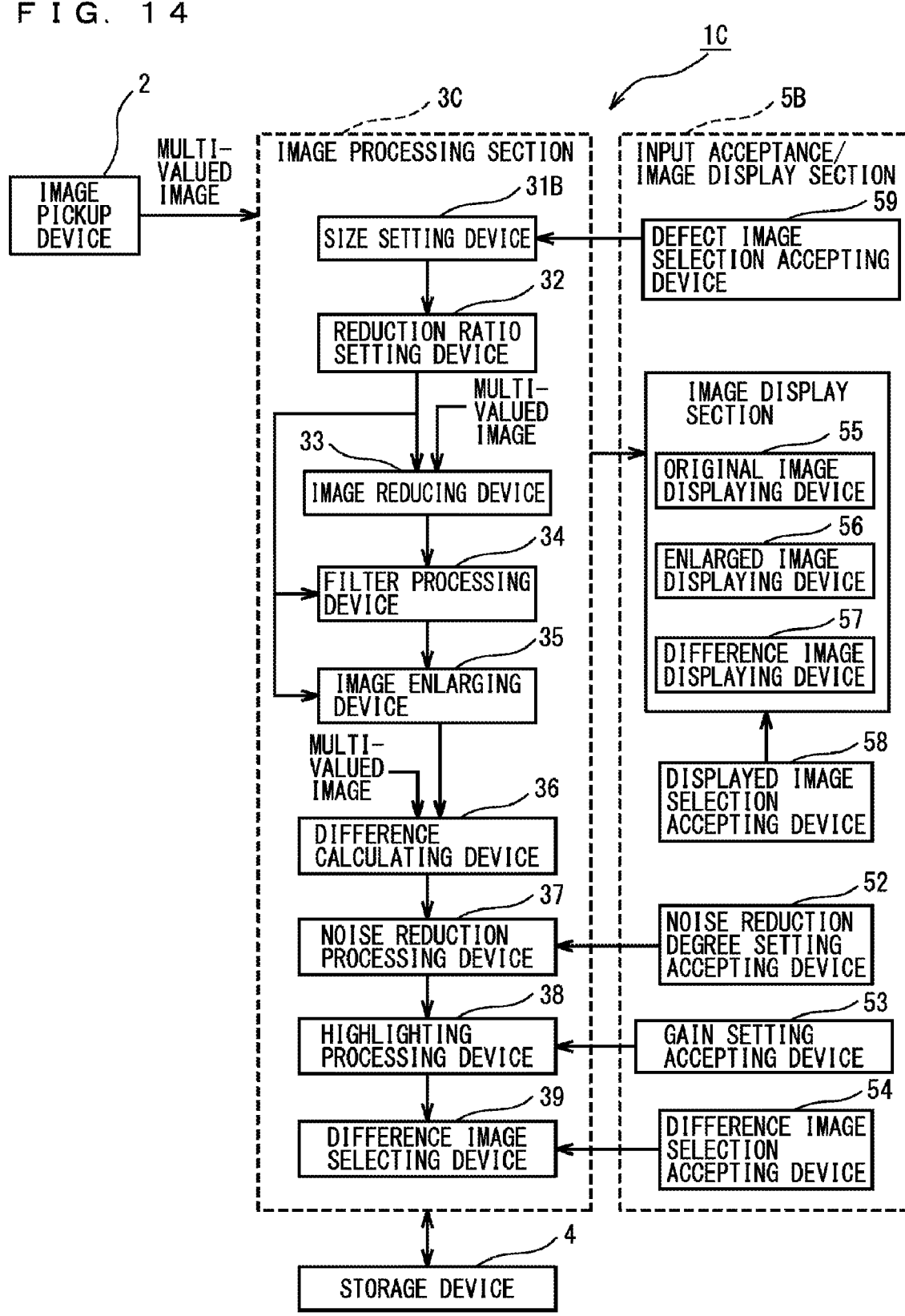
FIG. 14 is a block diagram showing a configuration example of a defect detection apparatus according to a third embodiment of the present invention.
Figure 15:
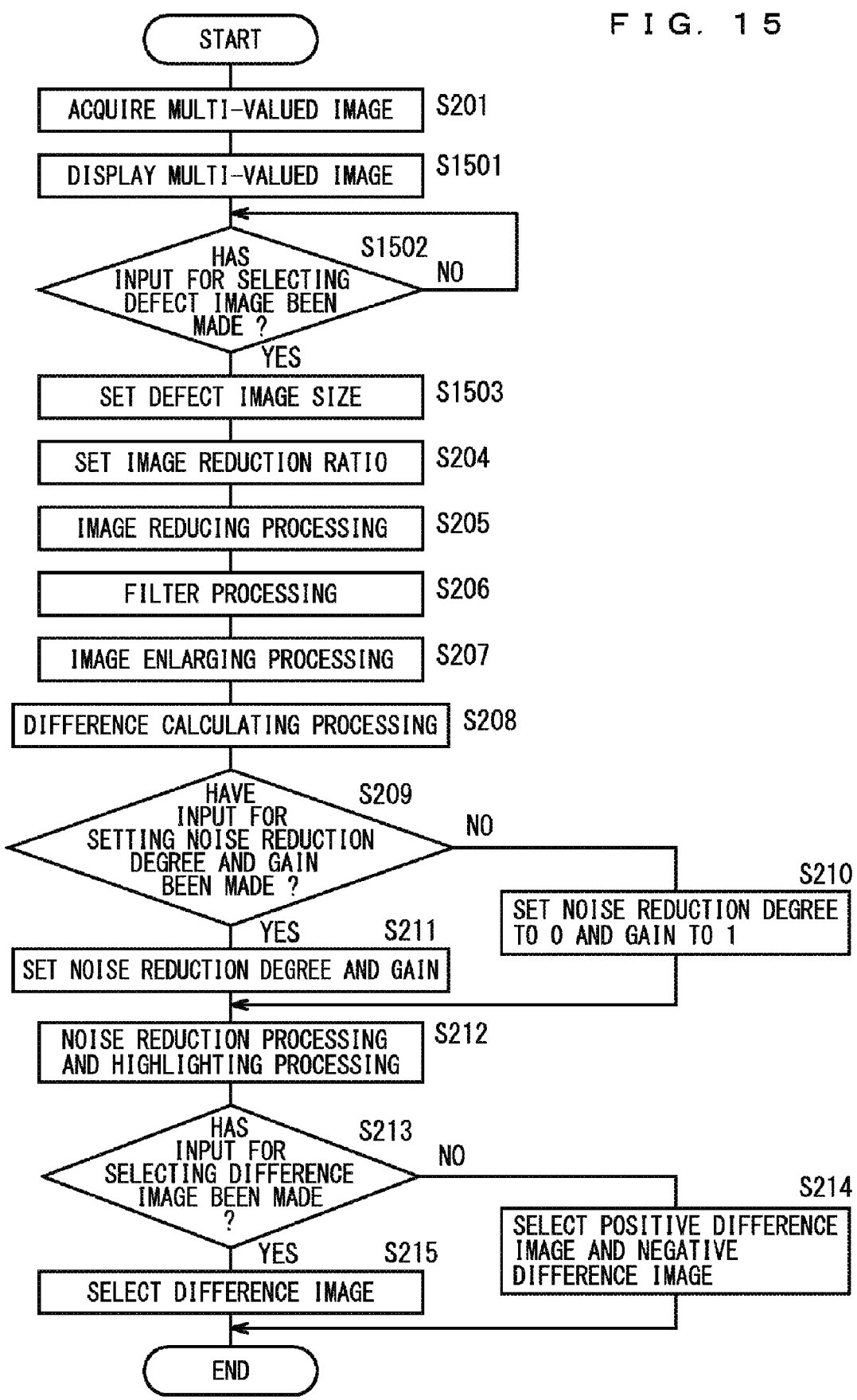
FIG. 15 is a flowchart showing each processing process of a defect detection method according to the present invention which is employed in the defect detection apparatus according to the present third embodiment.

FIG. 14 is a block diagram showing a configuration example of a defect detection apparatus according to a third embodiment of the present invention, and FIG. 15 is a flowchart showing each processing process of a defect detection method according to the present invention which is employed in the defect detection apparatus according to the present third embodiment. Each processing process of the defect detection method according to the present invention is executed by a computer program according to the present invention stored inside an image processing section 3C. In FIG. 14, a defect detection apparatus 1C according to the present third embodiment is configured of an image pickup device 2, an image processing section 3C, a storage device 4, and an input acceptance/image display section 5B.

It is to be noted that the present third embodiment is different from the first embodiment in a function of a size setting device 31B of the image processing section 3C and arrangement of a defect image selection accepting device 59 in the input acceptance/image display section 5B in place of the size setting accepting device 51. Further, in FIG. 15, the defect detection method of the present third embodiment is different from that of the first embodiment in that, in the processing processes of FIG. 2 referenced in the first embodiment, a processing process for displaying a multi-valued image (step S1501) is added, and a processing process for determining whether or not an input for setting a defect image (step S1502) has been made and a processing process for setting a defect image size (step S1503) are respectively provided in place of the processing process for determining whether or not an input for setting a defect size has been made (step S202) and the processing process for setting a defect size (step S203). The different points are mainly described below.

In FIG. 14, the defect image selection accepting device 59 accepts selection of an image corresponding to a defect as a detection object or an object as a non-detection object from a multi-valued image displayed on the original image displaying device 55. The size setting device 31B sets a defect size corresponding to the image accepted by the defect image selection accepting device 59.

In FIG. 15, first, the image processing section 3C acquires a multi-valued image of an object surface by image-pickup (step S201). Next, the image processing section 3C displays the acquired multi-valued image (step S1501), determines whether or not an input for selecting a defect image has been made by the user (step S1502), and sets a size of the defect image selected by the user (step S1503) when the input for selecting a defect image has been made (step S1502: YES).

Specifically, the user points a position where a defect wished to be detected is present on the image, and an image in a defined range with the pointed position taken at the center is subjected to labeling processing by bipolarization. A defect size is specified from the obtained labeling result. A threshold for use in this bipolarization may be set by the user or may be automatically decided. Examples of the method for automatically deciding a threshold may include "Ohtsu's method" employing a determination analysis method, as described in the following document: "Image Analysis Handbook", by Mikio Takagi and Hirohisa Shimoda, Tokyo University Press, 1991, p. 503. Or, the user may circle a defect portion by a mouse-input or the like so that a defect size may be specified from information of the circled figure.

As thus described, according to present the third embodiment, a defect image size is set only by the user selecting a defect image as a detection object or as a non-detection object from the displayed multi-valued image, and without depending upon a change and a variation in generation state of shading included in a multi-valued image acquired by image-pickup by the image pickup device 2, a shading image included in an enlarge image is made substantially consistent with a shading image included in the original multi-valued image by the image reduction device 33 and the image enlarging device 35, and a defect image of a size not larger than a size set by the user is removed from a reduced image by the filter processing device 34, so that a defect of a size not larger than the size desired by the user can be highly accurately detected from an image of a difference between the original multi-valued image and the enlarged image.

Fourth Embodiment

Figure 16:
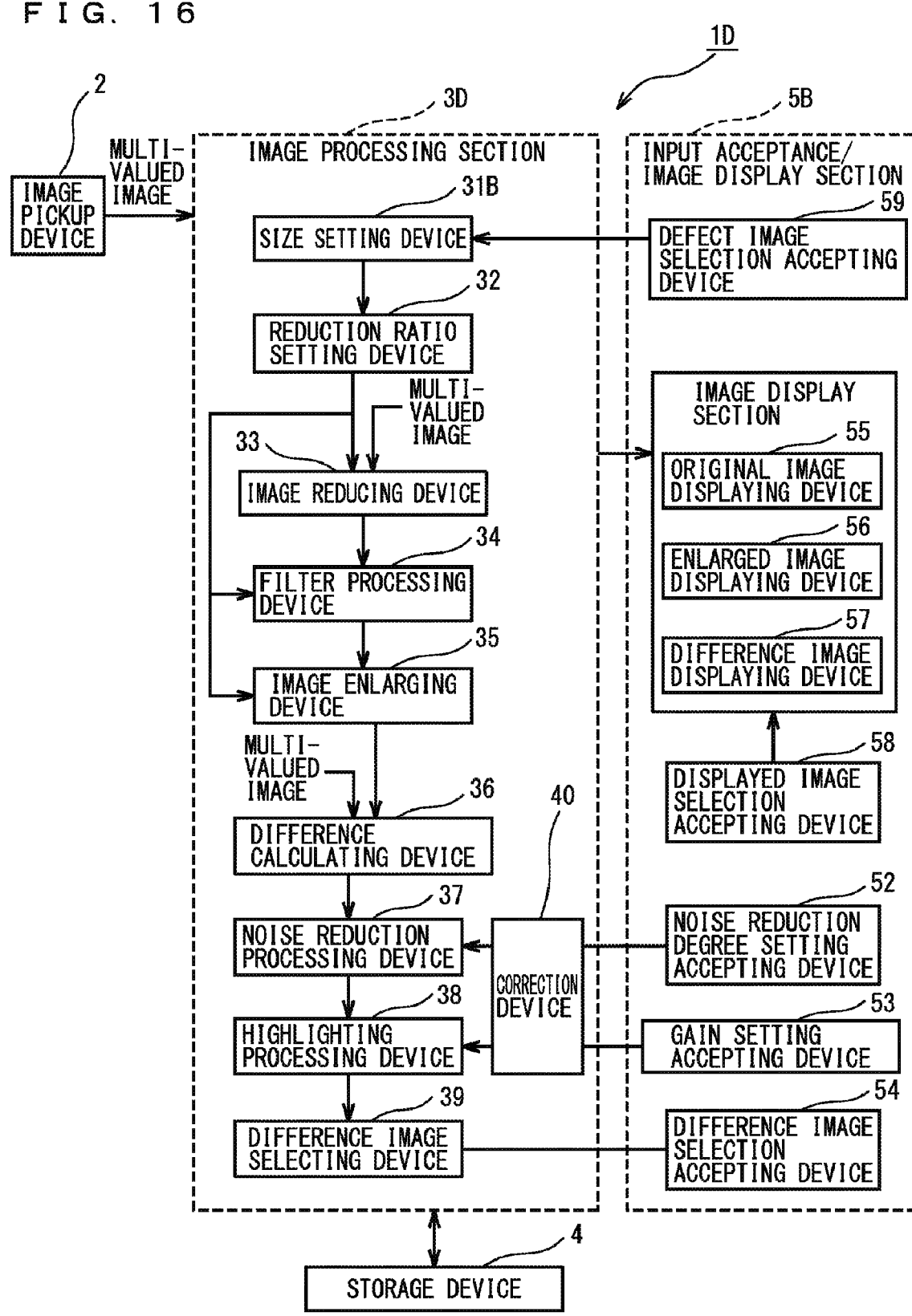
FIG. 16 is a block diagram showing a configuration example of a defect detection apparatus according to a fourth embodiment of the present invention.
Figure 17:
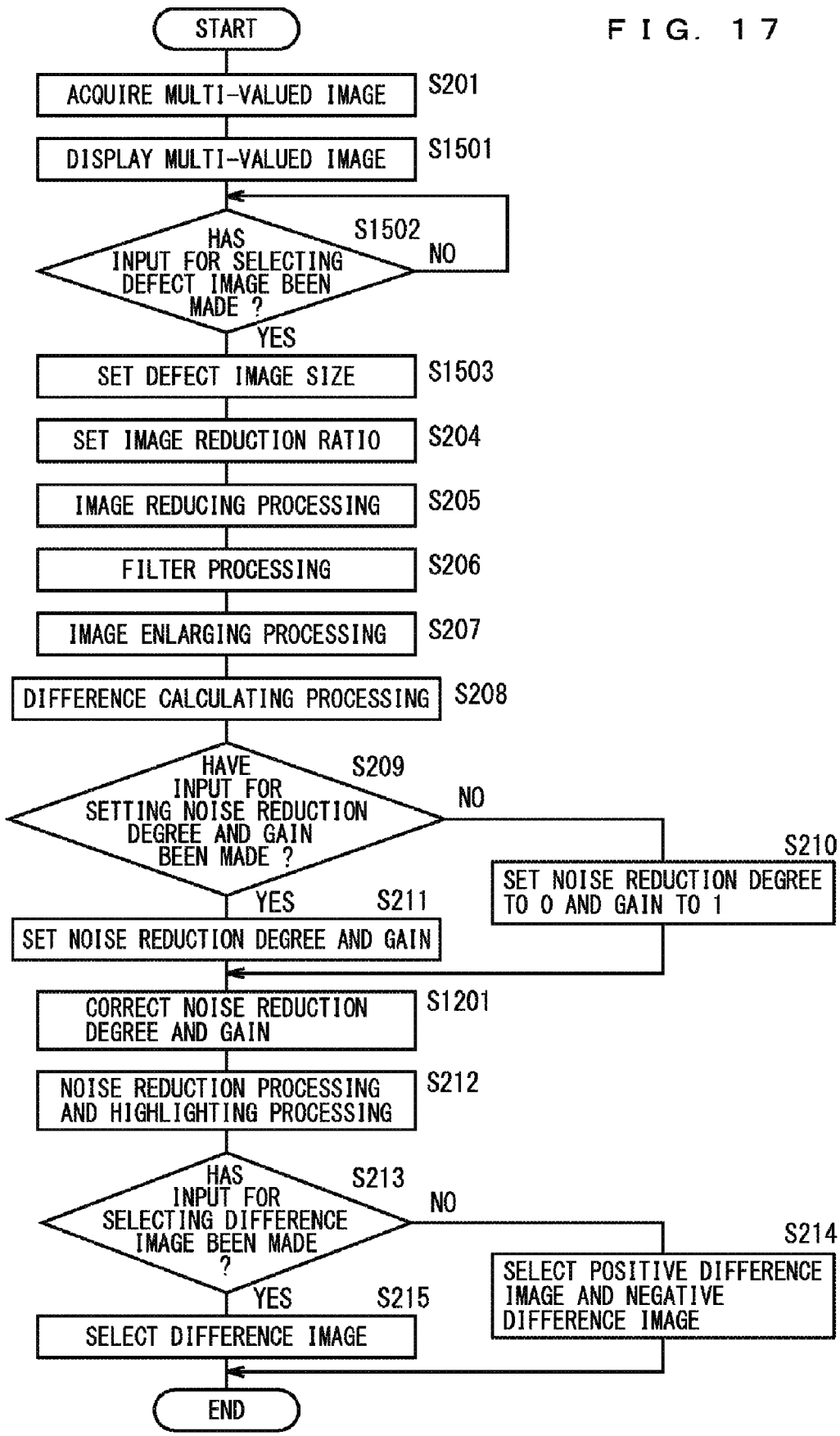
FIG. 17 is a flowchart showing each processing process of a defect detection method according to the present invention which is employed in the defect detection apparatus according to the present fourth embodiment.

FIG. 16 is a block diagram showing a configuration example of a defect detection apparatus according to a fourth embodiment of the present invention, and FIG. 17 is a flowchart showing each processing process of a defect detection method according to the present invention which is employed in the defect detection apparatus according to the present fourth embodiment. Each processing process of the defect detection method according to the present invention is executed by a computer program according to the present invention stored inside an image processing section 3D. In FIG. 16, a defect detection apparatus 1D according to the present fourth embodiment is configured of an image pickup device 2, an image processing section 3D, a storage device 4, and an input acceptance/image display section 5B.

It is to be noted that the present fourth embodiment is different from the third embodiment in that the image processing section 3C of the third embodiment is added with the correction device 40 of the second embodiment to form the image processing section 3D. Further, in FIG. 17, the defect detection method of the present fourth embodiment is different from that of the third embodiment in that the processing processes of FIG. 15 referenced in the third embodiment is added with the processing process for collecting a noise reduction degree and a gain in the second embodiment (step S1202). These differences have already been described in the second embodiment, and detailed descriptions thereof are not given.

As thus described, according to the present fourth embodiment, a defect image size is set only by the user selecting a defect image as a detection object or as a non-detection object from the displayed multi-valued image, and without depending upon a change and a variation in generation state of shading included in a multi-valued image acquired by image-pickup by the image pickup device 2, a shading image included in an enlarge image is made substantially consistent with a shading image included in the original multi-valued image by the image reduction device 33 and the image enlarging device 35, and a defect image of a size not larger than a size set by the user is removed from a reduced image by the filter processing device 34, so that a defect of a size not larger than the size desired by the user can be highly accurately detected from an image of a difference between the original multi-valued image and the enlarged image.

Further, dynamically collecting a noise reduction degree and a gain based upon a luminance value of the enlarged image can hold a luminance value of the signal and a luminance value of the noise with regard to the defect image of the difference image constant even when lighting is varying during image-pickup, and can further improve the accuracy of defect detection.

It is to be noted that, although the configuration using the median filter as the filter processing device 34 was described in each embodiment of the present invention, the present invention is not limited to such a configuration. For example, an expansion filter and a reduction filter may be used so long as a configuration is formed which is capable of removing a defect image from a reduced image.

It should be noted that, although the configuration where the filter size of the filter processing device 34 is variably set in accordance with the defect size (or image reduction ratio) was described in each embodiment of the present invention, the present invention is not limited to such a configuration, and the number of times of passage through the filter can be variably set with the filter size fixed. It is thereby possible to obtain the same effect of removing a defect image with a filter of a relatively small size as the effect obtained as the effect of a filter of a large size, so as to suppress the processing cost. For example, in the case of the expansion filter and the reduction filter, when the number of times of passage through a filter of a filter size of 3 (3×3 pixels) is set to five, the same effect can be obtained as the effect obtained with a filter of a filter size of 11 (11×11 pixels).

Further, the result of calculations by the difference calculating device is not necessarily held separately in the forms of the positive difference image and the negative difference image, but may be held as one difference image (e.g. the images may be stored with a value ±0 as the boundary of the positive and the negative expressed as a median value of data). Moreover, the series of the image enlarging device, the difference calculating device, the noise reduction processing device, the highlighting processing device, and the difference image selecting device is not necessarily performed such that the processing on a whole image is completed in each device and the process is then shifted to the next device, but the processing may be performed in pixel units in every processing. That is, sequentially from a pixel on the left top an image, the series of the image enlarging device (calculating the luminance value in an attention pixel in enlarged image), the difference calculating device, the noise reduction processing device, the highlighting processing device, and the difference image selecting device may be performed and a final result image may then be calculated.

The defect detection apparatus according to the present invention has an advantage of being capable of highly accurately detecting a defect of a size not larger than a size desired by the user without depending upon a change and a variation in generation state of shading, and is used in a variety of applications as a defect detection apparatus to be installed in a pre-process of a defect inspection apparatus.

What is claimed is:

1. A defect detection apparatus for detecting a defect on an image-picked-up object surface from a multi-valued image picked up by an image pickup device, the apparatus comprising:
   a size setting accepting device for accepting setting of a size of a defect as a detection object;
   a size setting device for setting the defect size accepted by the size setting accepting device;
   a reduction ratio setting device for setting an image reduction ratio in accordance with the defect size set by the size setting device;
   an image reducing device for generating a reduced image obtained by reducing the multi-valued image at the image reduction ratio;
   a filter processing device for performing filter processing on the reduced image for removing a defect in the reduced image;
   an image enlarging device for generating an enlarged image obtained by enlarging the reduced image, subjected to the filter processing by the filter processing device, at an image enlargement ratio corresponding to the reciprocal of the image reduction ratio; and
   a difference calculating device for generating a difference image obtained by performing a calculation of a difference between the multi-valued image and the enlarged image.

2. The defect detection apparatus according to claim 1, comprising:
   a noise reduction degree setting accepting device for accepting setting of a noise reduction degree on the difference image generated by the difference calculating device; and
   a noise reduction processing device for subtracting or adding the accepted noise reduction degree from or to the difference image, to generate a noise-reduction-processed image.

3. The defect detection apparatus according to claim 2, comprising
   a correction device for multiplying the noise reduction degree, the setting of which was accepted by the noise reduction degree setting accepting device, by a reduction degree correction value proportional to a luminance value of the enlarged image in pixel units.

4. The defect detection apparatus according to claim 2, comprising:
   a gain setting accepting device for accepting setting of a gain into the noise-reduction-processed image; and
   a highlighting processing device for multiplying the noise-reduction-processed image by the accepted gain to generate a highlighting-processed image.

5. The defect detection apparatus according to claim 4, comprising
   a correction device for multiplying the noise reduction degree, the setting of which was accepted by the noise reduction degree setting accepting device, by a reduction degree correction value proportional to a luminance value of the enlarged image in pixel units, and multiplying the gain, the setting of which was accepted by the gain setting accepting device, by a gain correction value inversely proportional to the luminance value of the enlarged image in pixel units.

6. The defect detection apparatus according to claim 1, comprising:
   a gain setting accepting device for accepting setting of a gain into the difference image; and
   a highlighting processing device for multiplying the difference image by the accepted gain to generate a highlighting-processed image.

7. The defect detection apparatus according to claim 6, comprising
   a correction device for multiplying the gain, the setting of which was accepted by the gain setting accepting device, by a gain correction value inversely proportional to a luminance value of the enlarged image in pixel units.

8. The defect detection apparatus according to claim 1, wherein
   the difference calculating device is configured to generate a positive difference image and a negative difference image, and
   the defect detection apparatus comprises:
   a difference image selection accepting device for accepting a selection of at least one difference image between the positive difference image and the negative difference image; and
   a difference image selecting device for selecting the accepted difference image.

9. The defect detection apparatus according to claim 8, comprising
   a difference image displaying device for displaying the difference image selected by the difference image selecting device.

10. The defect detection apparatus according to claim 1, wherein the filter processing device is configured to set a filter size or the number of times of passage through the filter larger with a larger image reduction ratio set by the reduction ratio setting device.

11. The defect detection apparatus according to claim 1, wherein the filter processing device is configured to set a filter size or the number of times of passage through the filter smaller with a smaller image reduction ratio set by the reduction ratio setting device.

12. The defect detection apparatus according to claim 1, wherein the filter processing device is configured to set a filter size or the number of times of passage through the filter larger with a larger defect size set by the size setting device.

13. The defect detection apparatus according to claim 1, wherein the filter processing device is configured to set a filter size or the number of times of passage through the filter smaller with a smaller defect size set by the size setting device.

14. The defect detection apparatus according to claim 1, wherein the filter processing device is configured to decide the filter size in accordance with the defect size set by the size setting device.

15. A defect detection apparatus for detecting a defect on an image-picked-up object surface from a multi-valued image picked up by an image pickup device, the apparatus comprising:
   an image display device for displaying the multi-valued image;
   a defect image selection accepting device for accepting a selection of an image corresponding to a defect as a detection object or a defect as a non-detection object from the multi-valued image displayed on the image display device;
   a size setting device for setting a defect size corresponding to the image accepted by the defect image selection accepting device;
   a reduction ratio setting device for setting an image reduction ratio in accordance with the defect size set by the size setting device;

an image reducing device for generating a reduced image obtained by reducing the multi-valued image at the image reduction ratio;

a filter processing device for performing filter processing on the reduced image for removing a defect in the reduced image;

an image enlarging device for generating an enlarged image obtained by enlarging the reduced image, subjected to the filter processing by the filter processing device, at an image enlargement ratio corresponding to the reciprocal of the image reduction ratio; and a difference calculating device for generating a difference image obtained by performing a calculation of a difference between the multi-valued image and the enlarged image.

16. A defect detection method employed in a defect detection apparatus for detecting a defect on an image-picked-up object surface from a multi-valued image picked up by an image pickup device, wherein setting of a size of a defect as a detection object is accepted, the accepted defect size is set, an image reduction ratio is set in accordance with the set defect size, a reduced image obtained by reducing the multi-valued image at the image reduction ratio is generated, filter processing for removing a defect in the reduced image is performed on the reduced image, an enlarged image obtained by enlarging the reduced image, subjected to the filter processing, at an image enlargement ratio corresponding to the reciprocal of the image reduction ratio is generated, and a difference image obtained by performing a calculation of a difference between the multi-valued image and the enlarged image is generated.

17. The defect detection method according to claim 16, wherein setting of a noise reduction degree into the generated difference image is accepted, and the accepted noise reduction degree is subtracted or added from or to the difference image, to generate a noise-reduction-processed image.

18. The defect detection method according to claim 17, wherein the noise reduction degree, the setting of which was accepted, is multiplied by a reduction degree correction value proportional to a luminance value of the enlarged image in pixel units.

19. The defect detection method according to claim 17, wherein setting of a gain into the noise-reduction-processed image is accepted, and the noise-reduction-processed image is multiplied by the accepted gain to generate a highlighting-processed image.

20. The defect detection method according to claim 19, wherein the noise reduction degree, the setting of which was accepted, is multiplied by a reduction degree correction value proportional to a luminance value of the enlarged image in pixel units, and the gain, the setting of which was accepted, is multiplied by a gain correction value inversely proportional to the luminance value of the enlarged image in pixel units.

21. The defect detection method according to claim 16, wherein setting of a gain into the difference image is accepted, and
the difference image is multiplied by the accepted gain to generate a highlighting-processed image.

22. The defect detection method according to claim 21, wherein the gain, the setting of which was accepted, is multiplied by a gain correction value inversely proportional to a luminance value of the enlarged image in pixel units.

23. The defect detection method according to claim 16, wherein a difference image generated by the difference calculation is made up of a positive difference image and a negative difference image, selection of at least one difference image between the positive difference image and the negative difference image is accepted, and the accepted difference image is selected.

24. The defect detection method according to claim 23, wherein the selected difference image is displayed.

25. The defect detection method according to claim 16, wherein the larger the set image reduction ratio, the larger a filter size or the number of times of passage through the filter is set.

26. The defect detection method according to claim 16, wherein the smaller the set image reduction ratio, the smaller a filter size or the number of times of passage through the filter is set.

27. The defect detection method according to claim 16, wherein the larger the set defect size, the larger a filter size or the number of times of passage through the filter is set.

28. The defect detection method according to claim 16, wherein the smaller the set defect size, the smaller a filter size or the number of times of passage through the filter is set.

29. The defect detection method according to claim 16, wherein the filter size is decided in accordance with the set defect size.

30. A defect detection method employed in a defect detection apparatus for detecting a defect on an image-picked-up object surface from a multi-valued image picked up by an image pickup device, wherein the multi-valued image is displayed, selection of an image corresponding to a defect as a detection object or a defect as a non-detection object is accepted from the displayed multi-valued image, a defect size corresponding to the accepted image is set, an image reduction ratio is set in accordance with the set defect size, a reduced image obtained by reducing the multi-valued image at the image reduction ratio is generated, filter processing for removing a defect in the reduced image is performed on the reduced image, an enlarged image obtained by enlarging the reduced image, subjected to the filter processing, at an image enlargement ratio corresponding to the reciprocal of the image reduction ratio is generated, and a difference image obtained by performing a calculation of a difference between the multi-valued image and the enlarged image is generated.

31. A non-transitory computer readable medium comprising a computer program, wherein a computer is made to execute the processing of
picking up an image of an object surface to acquire a multi-valued image;

accepting setting of a size of a defect as a detection object;
setting the accepted defect size;

setting an image reduction ratio in accordance with the set defect size;

generating a reduced image obtained by reducing the multi-valued image at the image reduction ratio;

performing filter processing on the reduced image for removing a defect in the reduced image;

generating an enlarged image obtained by enlarging the reduced image, subjected to the filter processing, at an image enlargement ratio corresponding to the reciprocal of the image reduction ratio; and generating a difference image obtained by performing a calculation of a difference between the multi-valued image and the enlarged image.

32. A non-transitory computer readable medium comprising a computer program, wherein a computer is made to execute the processing of picking up an image of an object surface to acquire a multi-valued image;

displaying the multi-valued image;

accepting a selection of an image corresponding to a defect as a detection object or a defect as a non-detection object from the displayed multi-valued image;

setting a defect size corresponding to the accepted image;

setting an image reduction ratio in accordance with the set defect size;

generating a reduced image obtained by reducing the multi-valued image at the image reduction ratio;

performing filter processing on the reduced image for removing a defect in the reduced image;

generating an enlarged image obtained by enlarging the reduced image, subjected to the filter processing, at an image enlargement ratio corresponding to the reciprocal of the image reduction ratio; and generating a difference image obtained by performing a calculation of a difference between the multi-valued image and the enlarged image.

* * * * *